United States Patent [19]
Leung et al.

[11] Patent Number: 4,620,294
[45] Date of Patent: Oct. 28, 1986

[54] DIGITAL SIGNAL PROCESSOR MODEM

[75] Inventors: Tommy Y. Leung, Cassopolis, Mich.; Mark A. Waldron, Elkhart, Ind.

[73] Assignee: CTS Corporation, Elkhart, Ind.

[21] Appl. No.: 530,690

[22] Filed: Sep. 9, 1983

[51] Int. Cl.$^4$ .......................... G06F 3/00; H04L 5/12
[52] U.S. Cl. ...................................... 364/900; 375/46
[58] Field of Search .................. 370/11, 19; 375/46, 375/56, 89, 62; 364/200 MS File, 900 MS File

[56] References Cited

U.S. PATENT DOCUMENTS

| | | | |
|---|---|---|---|
| 3,238,299 | 3/1966 | Lender | 178/68 |
| 3,292,086 | 12/1966 | Magnuski | 375/31 |
| 3,617,889 | 11/1971 | Rabinowitz | 375/46 |
| 3,617,941 | 11/1971 | DeLellis, Jr. | 332/16 R |
| 3,706,929 | 12/1972 | Robinson et al. | 325/15 |
| 3,745,250 | 7/1973 | Gerst | 375/56 X |
| 3,885,105 | 5/1975 | Hildenbrand | 370/19 X |
| 3,905,028 | 9/1975 | Wintz et al. | 340/347 NT X |
| 3,937,882 | 2/1976 | Bingham | 275/8 X |
| 3,958,191 | 5/1976 | Jones, Jr. | 332/1 |
| 3,987,374 | 10/1976 | Jones, Jr. | 332/9 R |
| 3,988,540 | 10/1976 | Scott et al. | 178/67 |
| 4,003,001 | 1/1977 | Jones, Jr. | 375/62 X |
| 4,008,373 | 2/1977 | Nash et al. | 375/56 X |
| 4,085,449 | 4/1978 | Walsh et al. | 364/900 |
| 4,263,670 | 4/1981 | Sherman | 375/9 |
| 4,290,140 | 9/1981 | Malm | 375/46 |
| 4,310,721 | 1/1982 | Manley et al. | 364/513.5 |
| 4,313,202 | 1/1982 | Kameya | 375/15 |
| 4,335,446 | 6/1982 | Gandini et al. | 364/900 |
| 4,387,440 | 6/1983 | Eaton | 364/900 |
| 4,404,532 | 9/1983 | Welti | 370/11 X |

OTHER PUBLICATIONS

Techo, *Data Communications, An Introduction to Concepts and Design*, Plenum Press, 1980, pp. 179–180.
M. Choquet and H. Nussbaumer, "Microcoded Modem Transmitters", IBM J. Res. Develop. 338–351 (Jul. 1974).
P. VanGerwen, N. Verhoeckx, H. Van Essen & F. Snijders, "Microprocessor Implementation of High-Speed Data Modems", IEEE Transactions on Communications, vol. Com–25, No. 2, 238–250 (Feb. 1977).
K. Wantabe, K. Inoue & Y. Sato, "A 4800 Bit/s Microprocessor Data Modem", I.E.E.E. Transactions on Communications, vol. Com–26, No. 5, 493–498 (May 1978).
D. Sherman & S. Verma, "System Description of a Programmable Multiple Data Set", National Telecommunications Conference, 23-9 through 23-12 (Dec. 1975).
A. Salazar, D. Sherman, S. Verma & J. Werner, "Implementation of Voiceband Modems on a Digital Signal Processor", National Telecommunications Conference, 23-13 through 23-16 (Dec. 1975).

*Primary Examiner*—Thomas M. Heckler
*Attorney, Agent, or Firm*—Rodger H. Flagg

[57] ABSTRACT

A dual speed, full duplex modem for transmitting and receiving data on a dialed-access telephone line includes a signal processor for storing samples corresponding to a sinusoidal waveform, for selecting samples at intervals determined by the mode in which the modem is operating to synthesize a signal for modulating by data for transmission, and for autocorrelating a received signal at a frequency determined by the mode in which the modem is operating to recover data from the received signal. The signal processor includes configuring input ports, and a microcomputer receives instructions related to the mode in which the modem is to operate to output a mode-configuring word to the configuring inputs. Conversion from the signal processor's digital output to the analog signal to the line and from the line's analog signal to the signal processor's digital input take place through two time-division multiplexed coder-decoders. The stored sinusoid is mu-law compressed. The modem can dual tone, multiple frequency dial. The DTMF pair requires a different amplitude from the amplitude of the synthesized signal for modulating by data for transmission. A power series expansion of the required amplitudes of the DTMF tone pair permits both the synthesized signal for modulating by data for transmission and the tones of the DTMF pair to be calculated from the mu-law compressed sinusoid.

31 Claims, 25 Drawing Figures

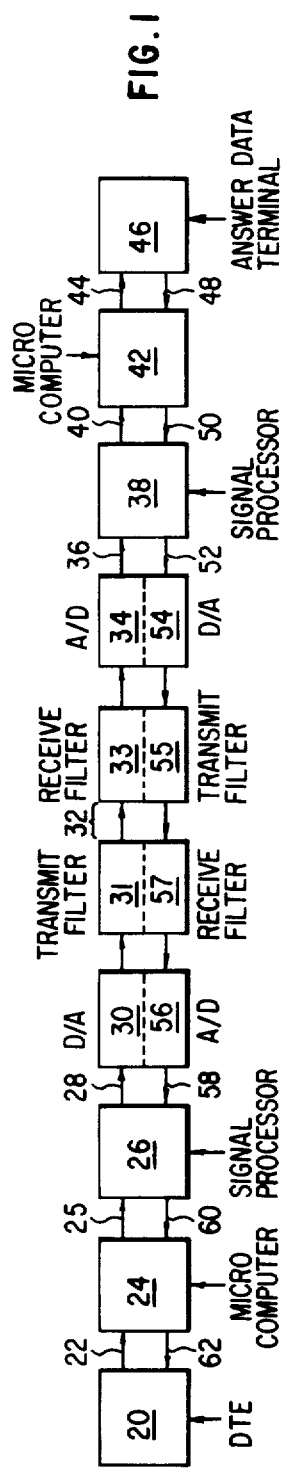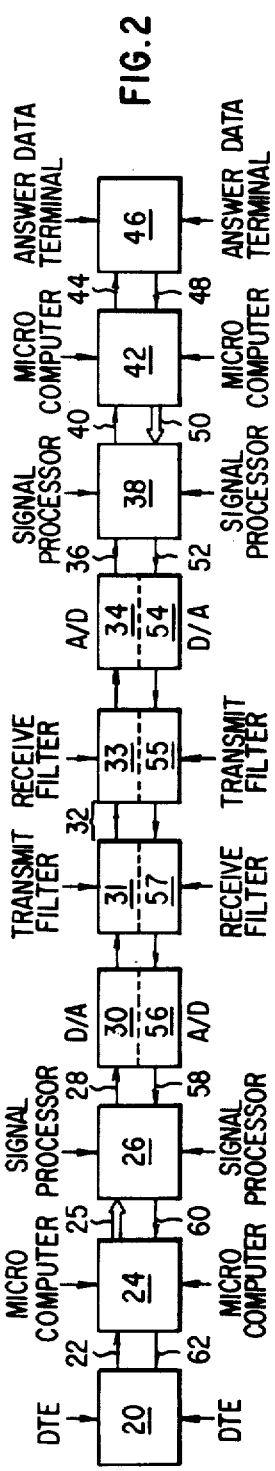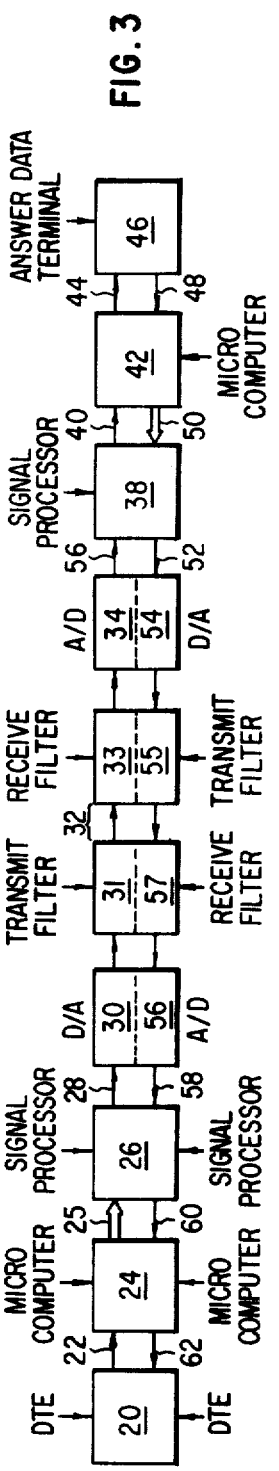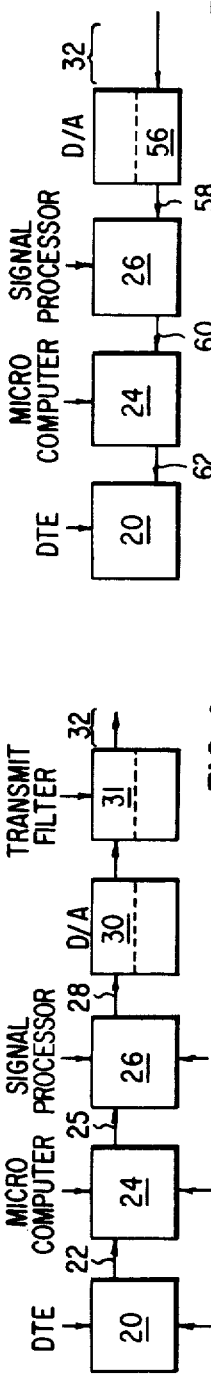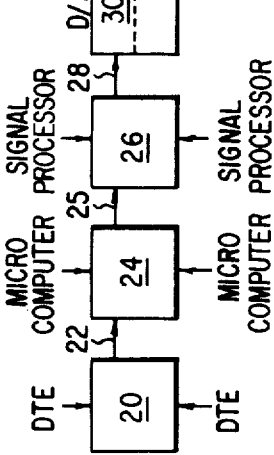

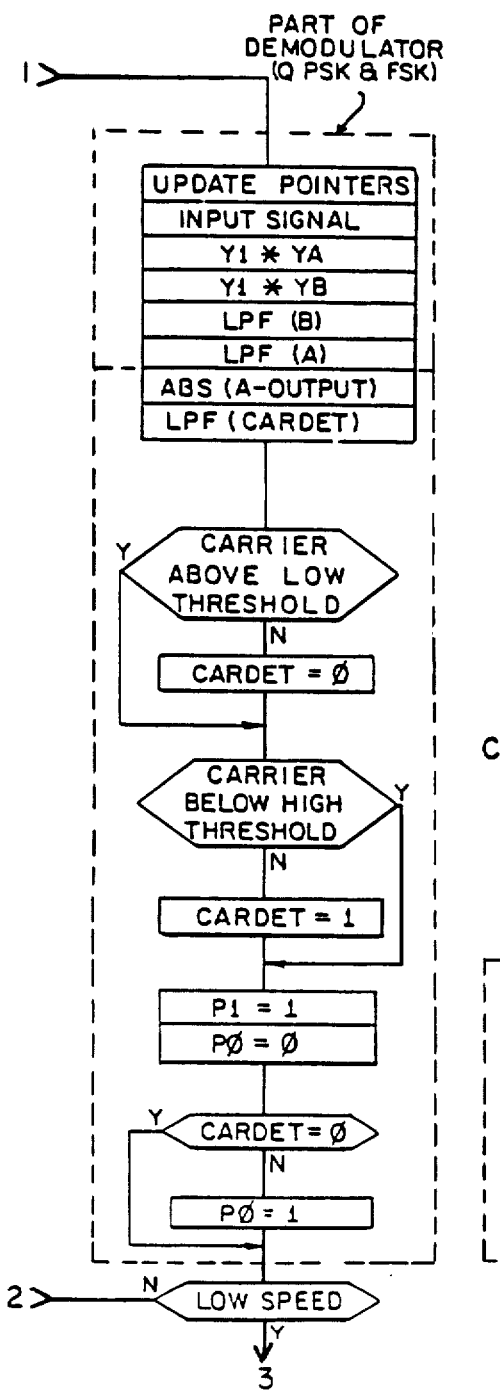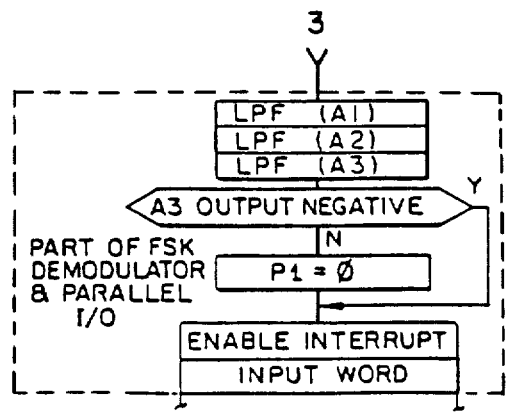
FIG. 9b
CARRIER DETECTOR
(HI & LO SPEED)

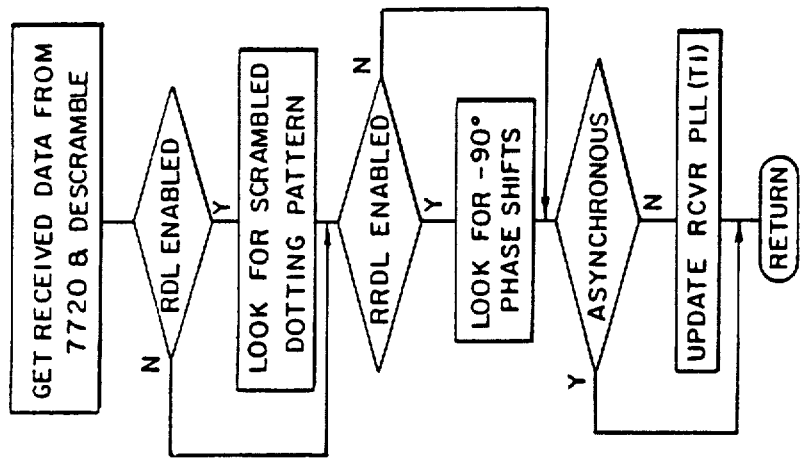
FIG. 19
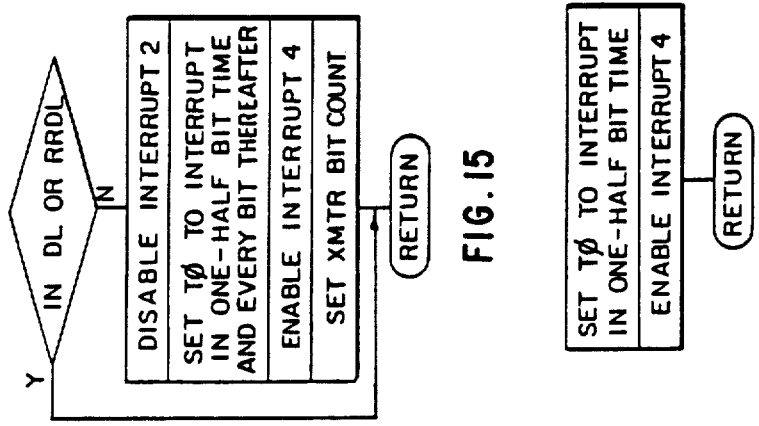
FIG. 15
FIG. 18
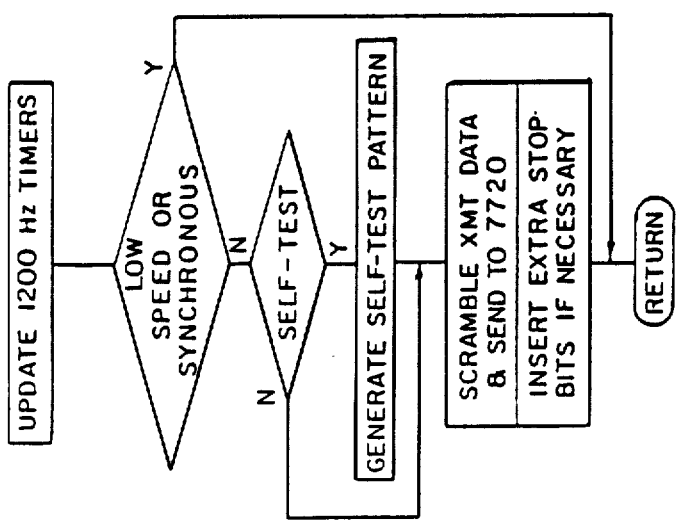
FIG. 16

DIGITAL SIGNAL PROCESSOR MODEM

This invention relates to modulator demodulator (modem) systems for transmitting and receiving data over conventional direct distance dial (DDD) networks, and more particularly to a two-speed full duplex modem.

There are known types of modems which have the capability to transmit in a low speed asynchronous mode (0-600 bits per second—bps) by coherent frequency shift keying (FSK), and in a high speed synchronous mode at 1,200 bps or character asynchronous 1,200 bps plus 1.0%, minus 2.5%, by quadrature differential phase shift keying (QDPSK). Typically, these systems permit a character length of 8, 9, 10 or 11 bits per character to be selected. These types of systems operate in the originate, manual answer, and automatic answer modes with full duplex at all speeds. They are data terminal equipment compatible, frequently through an RS-232c interface, and are DDD network compatible through a standard telephone line jack.

Typically, in the low speed mode, the originate modem transmits a "mark" ("1") at 1270 Hz±0.5% and a "space" ("0") at 1070 Hz±0.5%. The answer modem receives incoming information at 1270 Hz±0.5% for the mark and 1070 Hz±0.5% for the space. The answer modem sends a mark at 2225 Hz±0.5% and a space at 2025 Hz±0.5%. The originate modem receives a mark at 2225 Hz±0.5% and a space at 2025 Hz±0.5%.

In the high speed mode of operation, the originate modem transmits at 1200 Hz±0.01% and receives at 2400 Hz±0.01%. The answer modem transmits at 2400 Hz±0.01% and receives at 1200 Hz±0.01%.

Dual speed, full-duplex modems are known. There is, for example, the system described in U.S. Pat. No. 4,069,392. Various other features, such as coherent modulation, elastic data bits to negate data rate errors, data scrambler descrambler algorithms, analog loopback, both local and remote digital loopbacks, as well as other desirable features, are frequently incorporated into dual speed, full duplex modems of the type having the above-described characteristics. Reference is made to the following additional U.S. patents which discuss individual ones of these various features: U.S. Pat. Nos. 3,783,194; 3,619,503; 3,937,882; 4,304,962; and 3,515,805. As background information, the following listed U.S. patents may also be useful: U.S. Pat. Nos. 4,101,833; 4,049,909, 4,010,323; 3,997,847; and 4,048,440. The American Telephone & Telegraph Company, Bell System Purchased Products Division, Compatibility Bulletin No. 109 regarding compatibility criteria for data set 212A, is also useful for its background information content.

Regarding 212A data sets, it is useful to understand that in the low speed operating mode, the originating modem sends a 1270 Hz signal to correspond to a "1" data bit and a 1070 Hz data bit to correspond to a "0." The answering modem thus receives and decodes the 1270 Hz signal as a "1" data bit and the 1070 Hz signal as a "0" data bit. Simultaneously, since the system is a full duplex system, the answering modem may be transmitting information to the originating modem, with a 2225 Hz signal corresponding to a "1" data bit and 2025 Hz signal corresponding to a "0" data bit. Thus, the originating modem may be receiving information at these frequencies and decoding this information as "1" data bits (2225 Hz) and "0" data bits (2025 Hz). In the high speed mode, the data stream to be transmitted is divided into groups of two consecutive bits (called dibits). Such bit pairs, or dibits, can have the following values: 00; 01; 10; or 11. Each of these pairs is encoded as a phase change relative to the phase of the preceding dibit, with 00 being encoded as a plus 90° phase shift from the preceding dibit, 01 being encoded as a 0° phase shift from the preceding dibit; 10 being encoded at a 180° phase shift from the preceding dibit; and 11 being encoded as a −90° phase shift from the preceding dibit. At the receiver, the phase shifts are detected and the dibits thus decoded. The dibits are then further decoded into individual bits and reassembled in the correct order, with the left hand digit of the bit pair or dibit occurring first in the data stream.

In the high speed mode, frequency division multiplexing similar to that used in the low speed mode is used. The originate modem transmits at 1200 Hz±0.12 Hz, and the answer modem receives at this frequency. Since the operation is full duplex, the receive modem can simultaneously be transmitting data to the originate modem at 2400 Hz±24 Hz.

It will be appreciated from a review of the above-mentioned patents that considerable hardware is typically involved in the acceptance of a data stream from the data terminal equipment associated with the originate modem, frequency shift keying of the low-speed carrier in response to the incoming, originate data stream, placing the data stream on the line, receiving the data stream, and demodulating it to recover the data stream at the answer data terminal equipment. Typically, an equal amount of hardware is required to perform the same functions for data streams originating at the answer data terminal equipment and in relation to the associated modem, the telephone lines, the originate modem, and the originate data terminal equipment. A substantial additional amount of hardware is required to permit the modulation, transmission, reception and demodulation of high speed data streams from and to each of the originate and answer data terminal equipments.

It is a primary object of the present invention to take advantage of digital data processing techniques and digital to-analog and analog-to-digital conversion techniques to reduce quite substantially the hardware required to realize a dual speed, full-duplex modem data transmission and reception system.

According to the present invention, a dual speed, full-duplex modem system includes a signal processor for processing outgoing data to produce a first stream of digital (PCM) signals, a digital to analog converter and means for coupling the signal processor to the digital to analog converter to convert the first stream of digital (PCM) signals into a first quadrature differential phase shift keyed signal. The signal processor also is capable of simultaneously processing an incoming second stream of digital (PCM) signals and converting the second stream of digital (PCM) signals into received data. An analog to digital converter is provided, along with means for coupling the analog-to-digital converter to the signal processor to convert a second quadrature differential phase shift keyed signal into the second stream of digital (PCM) signals. The signal processor further is capable of processing outgoing data to produce a third stream of digital (PCM) signals. The digital-to-analog converter converts this third stream of digital (PCM) signals into a transmission-ready frequency shift keyed signal for low speed data transmission. The signal processor simultaneously can process a incoming fourth stream of digital (PCM) signals from the analog to digital converter and convert this fourth stream of digital (PCM) signals into received data at the low speed receive rate. The modem additionally comprises a microcomputer for receiving instructions regarding the first, second, third and fourth streams of digital (PCM) signals. Means are provided for coupling the microcomputer to the signal processor. The microcomputer controls the signal processor in response to the instructions to configure the signal processor to process the first and second streams of digital (PCM) signals or the third and fourth streams of digital (PCM) signals.

Further according to the present invention, the microcomputer controls the signal processor to access a conductor pair for data transmission between an originate data terminal equipment and an answer data terminal equipment coupled to each other by the conductor pair.

The invention may best be understood by referring to the following description and accompanying drawings which illustrate the invention. In the drawings:

FIG. 1 illustrates in block diagram form the system configuration for low speed full duplex data transmission;

FIG. 2 illustrates in block diagram form the system configuration for high speed asynchronous full-duplex data transmission;

FIG. 3 illustrates in block diagram form the system configuration for high speed synchronous full-duplex data transmission;

FIG. 4 illustrates in block diagram form the system configuration for dual tone, multiple frequency (DTMF or TOUCH TONE ®) dialing between an originate data terminal equipment and an answer data terminal equipment;

FIG. 5 illustrates in block diagram form the system configuration for a line status detector;

FIGS. 8a, 8b, 9a, 9b, 10a, 10b illustrate a flow chart of a routine followed by the signal processor of the modem of the present invention;

Figure 6A:
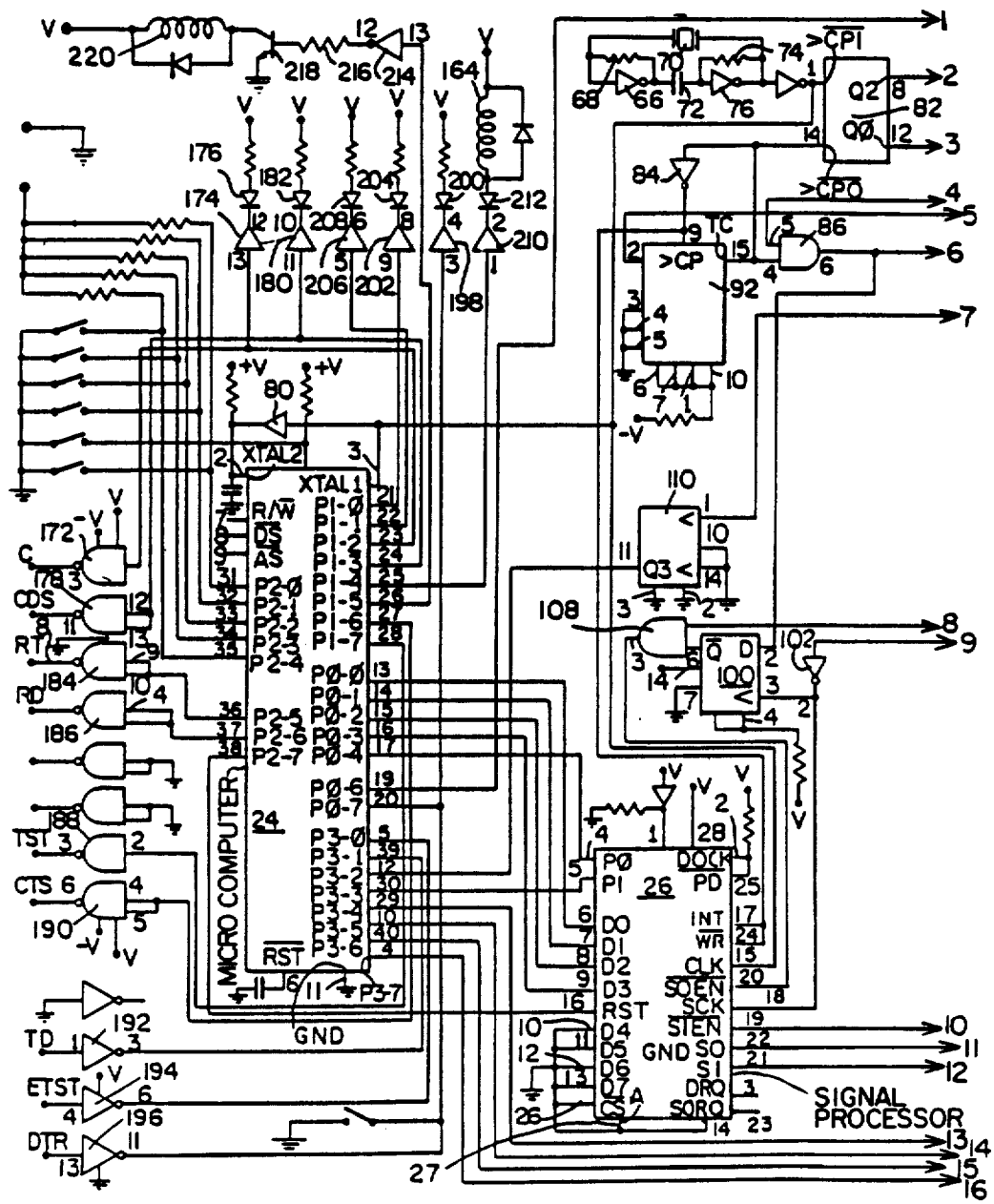
FIG. 6a and 6b illustrate in schematic diagram form a modem constructed according to the present invention.

Referring now particularly to FIG. 1, when a system incorporating modems constructed according to the present invention is operating in the low speed mode, an originate data terminal equipment 20 is transmitting data in the 0-600 bps range over a coupler 22 to a microcomputer 24, such as the Zilog Z8 microcomputer. The coupler 22 may include an interface, such as an RS232c interface. Data to be transmitted is steered by the microcomputer 24 through a coupler 25 to the transmitter section of a signal processor 26 such as a Nippon Electric Company, Ltd., Model 7720 signal processor. In the low speed configuration, the output signal on the coupler 28 of signal processor 26 is a pulse code modulated (PCM) signal. This information is coupled by coupler 28 to a digital-to-analog converter (D/A) 30. Typically, (D/A) 30 is the commonly used encoder-decoder or so called Codec. The output of D/A 30 through a transmit filter 31 to the line 32, which typically is a telephone line, is the FSK modulated low speed originate carrier, the FSK carrier. The equipment at the answer end of the system is essentially a mirror image of the equipment at the originate end, and includes a receive filter 33, an analog-to-digital converter (A/D) 34 (again, typically a Codec), a coupler 36 coupling the PCM Codec output to a receiver portion of a signal processor 38 (again, typically an N.E.C. 7720). The output of signal processor 38 appearing on a coupler 40 is provided to a receiver section of a microcomputer 42 (again, typically a Zilog Z8 microcomputer), the output of which is received data identical except for a time delay to the data appearing on coupler 22. This data, appearing on coupler 44 is provided to an answer data terminal equipment 46.

Simultaneously with the transmission of data from the originate DTE 20 and the reception of data on the answer DTE 46, data typically is being transmitted from the answer DTE 46 through this same network to the originate DTE 20. Typically, this transmitted answer data flows as data bits from the answer DTE 46 through a coupler 48, which again may include an interface such as the RS232c interface, to data processor 42. From data processor 42, this data flows through a coupler 50 to the signal processor 38 where it is converted into PCM signals. A coupler 52 couples the signal processor 38 to a D/A Codec 54 from which FSK answer signals are coupled through a transmit filter 55 to the line 32. At the originate station, answer signals are taken from the line 32 and supplied through a receive filter 57 to an A/D Codec 56. A/D Codec 56 takes the FSK answer signals from line 32 and converts them into PCM signals, which A/D 56 supplies over coupler 58 to signal processor 26. From signal processor 26 the received data, decoded from PCM signals on coupler 58, is supplied through a coupler 60 to microcomputer 24. The received answer data at low speed is then supplied via a coupler 62 from microcomputer 24 to the originate DTE 20. In this configuration, although converters 30, 34, 54 and 56 have been described as separate components, it is to be understood that the same circuits can operate both as a D/A converter and as an A/D converter (or PCM signal to FSK signal converter and FSK signal to PCM signal converter). An example of such an integrated circuit is the 2910A Codec.

In the high speed asynchronous mode, the microcomputers 24, 42 configure the system as illustrated in FIG. 2. The significant changes in the system are the addition of extra channels in couplers 25, 50 to accommodate the serial bit pairs from microcomputers 24, 42 which have been converted into parallel bits for generation of the dibits in signal processors 26, 38.

In the high-speed asynchronous mode, the signal on lines 32 is QDPSK. Additionally, in accordance with the convention established for such modems, the serial-to-parallel data and parallel-to serial data on couplers 25, 50, and 40, 60 is "scrambled." The scrambling of the data prior to transmission and unscrambling of the received data are accomplished by the microcomputers 24, 42 in accordance with a known scrambler/unscrambler algorithm. Reference is here made particularly to the above identified American Telephone and Telegraph Company Bell System Purchased Products Division Compatibility Bulletin No. 109.

In the high-speed synchronous mode illustrated in FIG. 3, the system is configured generally as discussed in connection with FIG. 2. However, in the synchronous mode, timing information must be supplied to or from transmitting DTEs 20, 46, and must be recovered by the receive microcomputer 42, 24 for use by the receiving DTEs 20, 46. In the high speed synchronous mode, any one of three timing techniques can be employed, and the software with which microcomputers 24, 42 are programmed can insert and recover the timing information without regard to which of these techniques is employed by the data transmission system.

Timing may be internal, in which case the microcomputers 24, 42 generate accurate 1200 Hz signals (from internal oscillators and clocks). Illustratively, these clock signals are divided down from highly accurate clock signals several orders of magnitude higher. In the illustrative embodiment, for example, a 7.3728 MHz±0.005% oscillator signal is divided by 6144 to achieve the 1200 Hz±0.005% internal clock.

If external timing is used, the originate DTE 20 supplies timing in synchronism with bits of data flowing from it to the microcomputer 24, and answer DTE 46 supplies timing in synchronism with the bits flowing from it to its associated microcomputer 42. This timing information is recovered from the received signals at the respective microcomputers 42, 24.

In the third timing technique, slave timing, timing information is derived from the received signal. In this timing scheme, timing pulses are typically "0 going" pulses appearing just prior to each data bit followed a half bit later by a logic "1" level, regardless of the logic level of the received data. These timing pulses are recovered from the received data and the received data is reconstructed then with the timing pulses removed. The timing information is then supplied to the receiving DTE, whether answer DTE 46 or originate DTE 20.

In the DTMF dialing mode, the configuration illustrated in FIG. 4, the originate DTE 20 produces an American Standard Code of Information Interchange (ASCII) coded answer DTE 46-station telephone number. This ASCII coded telephone number is provided through coupler 22 to microcomputer 24 where it is converted to a four bit hexadecimal (hex) code. It is supplied then through coupler 25 to the signal processor 26 which converts this four bit hex telephone number code to PCM code. The D/A 30 then converts this PCM code to the known DTMF code. The code is transmitted through filter 31 and accesses telephone line 32 through conventional central office switching equipment. The microcomputer 24 is also programmable to conduct pulse dialing.

FIG. 5 illustrates the system configuration in the line status detection mode. In this mode, the system can detect a dial tone, a busy tone, a network busy tone and ring back. The status tone is received from the line 32, bypasses filter 57, and is converted to a pulse code modulated signal in A/D 56. The pulse code modulated signal is supplied through the coupler 58 to signal processor 26 where it is converted to a line status logic signal on coupler 60. The line status logic signal on coupler 60 is processed by the microcomputer 24 and a status message is supplied across coupler 62 to the originate DTE 20.

Figure 6B:
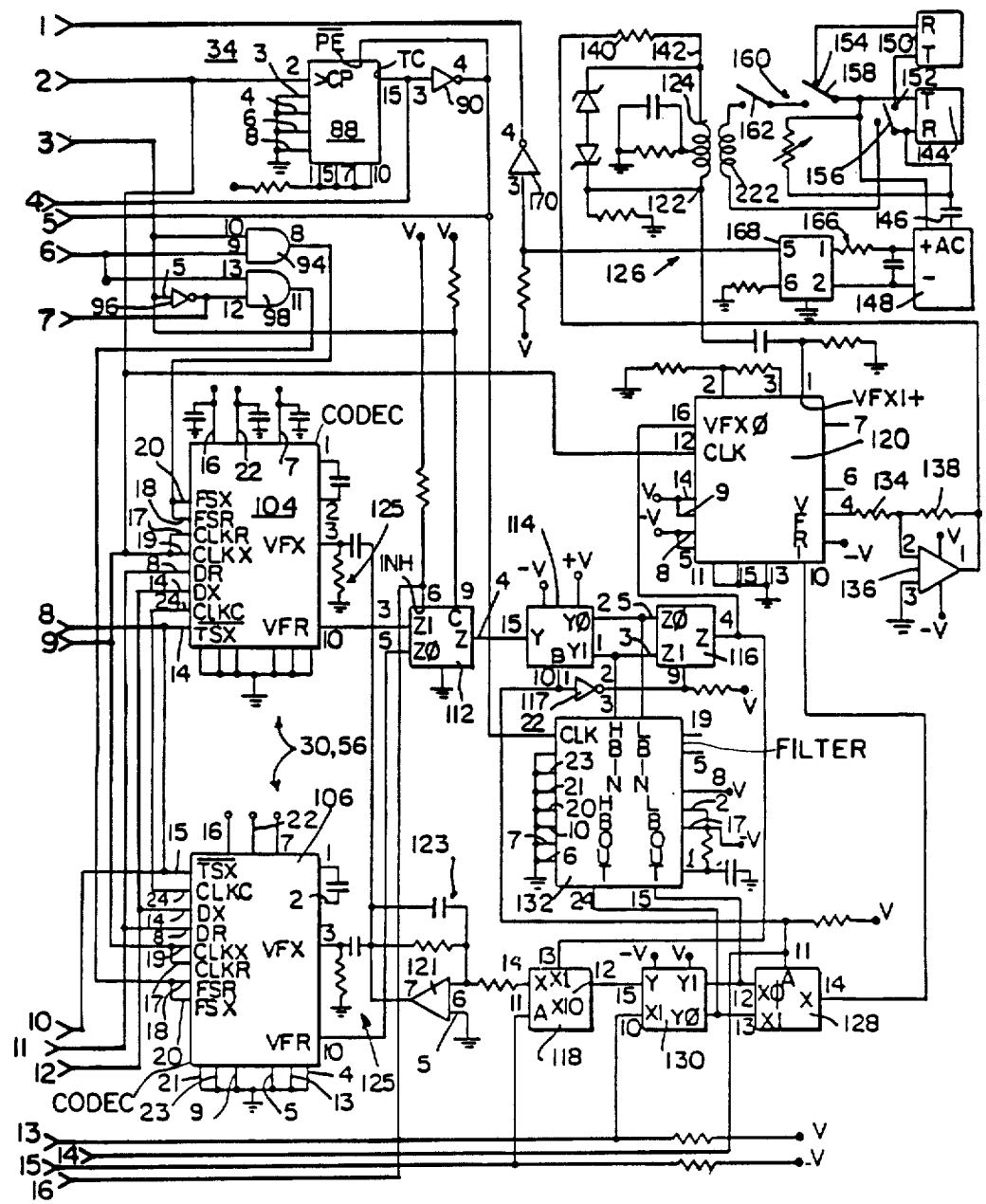

Turning now to a specific circuit realization of the modem, and referring particularly to FIGS. 6a and 6b, the illustrated microcomputer 24, signal processor 26 and Codec 30, 56 are provided with terminal or pin identities corresponding to those terminal or pin identities if the microcomputer 24 is a Zilog Model 8601 integrated circuit (Z8), signal processor 26 is a NEC 7720 integrated circuit and D/A-A/D 30, 56 comprises two 2910A integrated circuits (Ccdecs). In addition to these integrated circuits, which are coupled together in the illustrated configuration, the modem comprises an oscillator/clock 64 including an inverting amplifier 66, the output of which is coupled through a resistor 68 to its input and to one terminal of an oscillator crystal 70. The output of amplifier 66 is also coupled to one terminal of the capacitor 72 the other terminal of which is coupled through a resistor 74 to the other terminal of crystal 70 and to the output of an inverting amplifier 76. The junction of resistor 74 and capacitor 72 is also coupled to the input terminal of inverting amplifier 76. The output terminal of inverting amplifier 76 is coupled to the input terminal of a buffer inverting amplifier 78. The output of this amplifier 78 provides the high frequency CLK signal to pin 15 of signal processor 26. This signal is also provided to the XTAL 1 input, pin 3, of microcomputer 24 and through an inverting amplifier 80 to the XTAL-2 input, pin 2, of microcomputer 24. The output signal from buffer amplifier 78 is also provided to the >$\overline{CPI}$ terminal, pin 1, of an integrated circuit 82 such as the LS93. The >$\overline{CPO}$ terminal, pin 14 of integrated circuit 82 is coupled through an inverting amplifier 84 to terminals INT and $\overline{WR}$, pins 17, 24, respectively, of signal processor 26. A 19.2 KHz clock signal is provided to these pins by this connection.

Pin 14 of integrated circuit 82 is also coupled to an input terminal, pin 4 of an AND gate 86, such as an LS08. The Q2 terminal, pin 8, of integrated circuit 82 is coupled to the >CP input terminal, pin 2 of an integrated circuit 88 such as an LS163 integrated circuit. The TC terminal, pin 15, of integrated circuit 88 is coupled to an input terminal, pin 3, of an inverting amplifier 90, such as an LS04 amplifier. The output terminal, pin 4, of inverting amplifier 90 is coupled to the >CP terminal, pin 2, of an integrated circuit 92, such as an LS163 integrated circuit. Pin 4 of inverting amplifier 90 is also coupled through an inverter to the $\overline{PE}$ terminal of integrated circuit 88. The TC terminal, pin 15 of integrated circuit 92 is coupled to pin 4 of AND gate 86. The TC terminal, pin 15, of integrated circuit 88 is coupled to another input terminal, pin 5, of AND gate 86. The output terminal, pin 6, of AND gate 86 is coupled to an input terminal, pin 9. of an AND gate 94. A Q0 terminal, pin 12, of integrated circuit 82 is coupled to another input terminal, pin 10, of AND gate 94. Illustratively, AND gate 94 is an LS08 integrated circuit. The Q0 terminal of integrated circuit 82 is also coupled to an input terminal, pin 5, of an inverting amplifer 96 such as an LS04 amplifier. An output terminal, pin 6, of inverting amplifier 96 is coupled to an input terminal, pin 12 of an AND gate 98. Another input terminal, pin 13, of AND gate 98 is coupled to pin 9 of AND gate 94 and to a D terminal, pin 2, of an integrated circuit 100, such as the type LS74 integrated circuit. The < input terminal, pin 3, of integrated circuit 100 is coupled to the output terminal, pin 2 of an inverting amplifier 102, such as the type LS04 inverting amplifier. Pin 3 of integrated 100 is also coupled to the SCK terminal, pin 18, of the signal processor 26. The input terminal, pin 1, of amplifier 102 is coupled to both the CLKR and CLKX terminals, pins 17 and 19, respectively, of the two Codecs 104, 106 forming the D/A A/D 30, 56. The $\overline{Q}$ terminal, pin 6, of integrated circuit 100 is coupled to an input terminal, pin 1, of an AND gate 108, such as a type LS08 AND gate. Another input terminal, pin 2, of AND gate 108 is coupled to the $\overline{\text{TSX}}$ terminals, pins 15, of Codecs 104, 106. These terminals are also coupled to the $\overline{\text{SIEN}}$ terminal, pin 19, of signal processor 26. The output terminal, pin 3, of AND gate 108 is coupled to the $\overline{\text{SOEN}}$ terminal, pin 20, of signal processor 26. The CLKC terminals, pins 24, of Codecs 104, 106 are coupled together. The DX terminals, pins 14, of Codecs 104, 106 are coupled together and to the SI terminal, pin 21, of signal processor 26. The DR terminals, pins 8, of Codecs 104, 106 are coupled together and to the SO terminal, pin 22, of signal processor 26. The FSX and FSR terminals, pins 20, 18, respectively, of Codec 104 are coupled to the output terminal, pin 8, of AND gate 94. The FSX and FSR terminals, pins 20, 18, respectively, of Codec 106 are coupled together and to the output terminal, pin 11, of AND gate 98. Pin 6 of inverting amplifier 96 is coupled to a < input terminal, pin 1, of an integrated circuit 110, such as the type LS93 integrated circuit. The Q3 terminal, pin 11, of integrated circuit 110 is coupled to the P3-2 terminal, pin 12 of microcomputer 24. The input terminal, pin 5, of inverting amplifier 96 is coupled to the C terminal, pin 9, of an integrated circuit 112, such as the type 4053 integrated circuit. The Z1 terminal, pin 3, of integrated circuit 112 is coupled to the VFR terminal, pin 10, of Codec 104. The Z0 terminal, pin 5, of integrated circuit 112, is coupled to the VFR terminal, pin 10, of Codec 106. The INH terminal, pin 6, of integrated circuit 112 is coupled to the P3 7 terminal, pin 4, of microcomputer 24. The Z terminal, pin 4, of integrated circuit 112 is coupled to the Y terminal, pin 15, of an integrated circuit 114 which illustratively is also a type 4053 integrated circuit. The Y0 terminal, pin 2, of integrated circuit 114 is coupled to the Z0 terminal, pin 5, of an integrated circuit 116, which illustratively is also a type 4053 integrated circuit. The Y1 terminal, pin 1, of integrated circuit 114 is coupled to the Z1 terminal, pin 3, of integrated circuit 116. The B terminal, pin 10, of integrated circuit 114 is coupled to an input terminal, pin 1, of an inverting amplifier 117 such as the type LS04, the output terminal, pin 2, of which is coupled to the C terminal, pin 9, of integrated circuit 116. Pin 4 of integrated circuit 116 is coupled to a terminal X1, pin 13, of an integrated circuit 118. The Z terminal, pin 4 of integrated circuit 116 is also coupled to VFX0 terminal, pin 16, of an integrated circuit 120. Integrated circuit 120 illustratively is a type 2912 integrated circuit. The X terminal, pin 14, of integrated circuit 118 is coupled through a resistor to a (−) input terminal, pin 6, of a gain adjusting amplifier 121. Amplifier 121 illustratively is a type 1458 integrated circuit. The output terminal, pin 7, of amplifier 121 is coupled through a parallel R-C feedback network 123 to its (−) input terminal. The output terminal of amplifier 121 is also coupled through R-C networks 125 to the VFX terminals of Codecs 104, 106. The CLK terminal, pin 12, of integrated circuit 120 is coupled to pin 8 of integrated circuit 82. The VFXI+ terminal, pin 1, of integrated circuit 120 is coupled to a terminal 122 of a primary winding 124 of a DAA-type telephone line interface 126. The VFRI terminal, pin 10, of integrated circuit 120 is coupled to the X terminal, pin 14, of an integrated circuit 128, which illustratively is a type 4053 integrated circuit. Terminal X0, pin 12, of integrated circuit 128 is coupled to terminal Y1, pin 1, of an integrated circuit 130. Integrated circuit 130 illustratively is also a type 4053 integrated circuit. Terminal X1, pin 13, of integrated circuit 128 is coupled to terminal Y0, pin 2, of integrated circuit 130. Terminal Y, pin 15, of integrated circuit 130 is coupled to terminal X0, pin 12, of integrated circuit 118. Terminal B, pin 10, of integrated circuit 130 is coupled to terminal P3-4, pin 29, of microcomputer 24. Terminal A, pin 11, of integrated circuit 128 is coupled to pin 10 of integrated circuit 114 and to terminal P3 5, pin 10, of microcomputer 24. Terminal A, pin 11, of integrated circuit 118 is coupled to terminal P3-6, pin 40, of microcomputer 24. Pin 1 of integrated circuit 114 is coupled to terminal HBIN, pin 3, of an integrated circuit 132, such as the type R5632 integrated circuit, or so-called Reticon 212 filter. Pin 2 of integrated circuit 114 is coupled to the LBIN terminal, pin 18, of filter 132. The HBOUT terminal, pin 24, of filter 132 is coupled to Pin 2 of integrated circuit 130. The LBOUT terminal, pin 15, of filter 132 is coupled to pin 1 of integrated circuit 130. The CLK terminal, pin 22, of the Reticon filter 132 is coupled to pin 4 of inverting amplifier 90. Pin 4 of integrated circuit 120 is coupled through a resistor 134 to an input terminal, pin 2, of an amplifier 136, such as the type 1458 amplifier. The output terminal, pin 1, of amplifier 136 is coupled through a resistor 138 to its pin 2, and through a resistor 140 to a terminal 142 of the DAA interface 126.

The P0 terminal, pin 4, of signal processor 26 is coupled to the P0-4 terminal, pin 17, of microcomputer 24. The P1 terminal, pin 5, of signal processor 26 is coupled to the P3-3 terminal, pin 30, of microcomputer 24. The P0-0 terminal, pin 13, of microcomputer 24 is coupled to the D0 terminal, pin 6, of signal processor 26. The P0-1 terminal, pin 14, of microcomputer 24 is coupled to the D1 terminal, pin 7, of signal processor 26. The P0-2 terminal, pin 15, of microcomputer 24 is coupled to the D2 terminal, pin 8, of signal processor 26. The P0-3 terminal, pin 16, of microcomputer 24 is coupled to the D3 terminal, pin 9, of signal processor 26. The P2-7 terminal, pin 38, of microcomputer 24 is coupled to the RST terminal, pin 16, of signal processor 26. A telephone jack 144 is provided for input from the telephone line. The R, or ring, terminal of jack 144 is coupled through a capacitor 146 to one telephone terminal of a diode bridge 148. The T, or tip, input terminal of jack 144 is coupled to the other telephone terminal of bridge 148. Another telephone jack 150 is provided for coupling to a telephone set which permits voice communication with the telephone set used in conjunction with the remote modem (not shown). The T and R terminals of jack 150 are coupled to terminals 152, 154, respectively, of switches 156, 158, respectively of a data/talk relay 160. This relay permits the user of the modem to select whether voice communication is to be achieved through telephone jack 150 or data communication is to be achieved through telephone jack 144. A switch 162 is associated with the off-hook relay coil 164. The + output terminal and − output terminal of diode bridge 148 are coupled through a filter network 166 to input terminals 1, 2, respectively, of an interface integrated circuit 168 which reduces the ring detector voltage across the telephone terminals of bridge 148 to a logic level, typically +5 VDC, at pin 5 of interface 168. This signal at pin 5 of interface 168 is inverted by an inverting amplifier 170, such as the type LS04 and furnished to terminal P0-6, pin 19, of microcomputer 24.

The RS232C interface for the modem includes a DATA SET READY (DSR) line which is coupled to the output terminal, pin 3, of a NAND gate 172. Gate 172 illustratively is of the type which appears on a type 1488 integrated circuit. The input terminal, pin 2, to NAND gate 172 is coupled to the P1-2 terminal, pin 23, of microcomputer 24 and to an input terminal, pin 13, of a driver amplifier 174. The output terminal, pin 12 of driver amplifier 174 drives a LED 176. The lighting of LED 176 indicates that the modem is ready, that is, that the DATA SET READY on the interface is active. An output terminal, pin 11, of a NAND gate 178 is the CARRIER DETECT (CD) terminal of the RS232C interface. The input terminals, pins 12, 13 of NAND gate 178 are coupled together and to terminal P1-3, pin 24, of microcomputer 24. These terminals are also coupled to an input terminal, pin 11, of a driver amplifier 180. The output terminal, pin 10, of driver amplifier 180 is coupled to an LED 182. Lighting of LED 182 indicates that the modem has detected a carrier signal. The RECEIVE TIMING (RT) line of the RS232C interface is coupled to an output terminal, pin 8, of a NAND gate 184, the input terminals, pins 9 and 10, of which are coupled to terminal P2-5, pin 36 of microcomputer 24. The presence of a "1" signal on pin 8 of gate 184 when the modem is operating in the high speed synchronous mode indicates that there is timing in the signal received from the modem. A RECEIVED DATA (RD) line is coupled to the output terminal, pin 6, of a NAND gate 186. The input terminals, pins 4 and 5, of NAND gate 186 are coupled together and to a terminal P2-6, pin 37, of microcomputer 24. The presence of a signal on this line indicates the presence of data in the signal received from the modem. A TRANSMIT SIGNAL TIMING (TST) line is coupled to an output terminal, pin 3, of a NAND gate 188. The input terminal, pin 2, of NAND gate 188 is coupled to terminal P1-7, pin 28, of microcomputer 24. In the high speed synchronous mode of operation, the presence of a signal on this line indicates that there is timing in the transmitted signal. A CLEAR TO SEND (CTS) line is coupled to the input terminal, pin 6, of a NAND gate 190. The input terminals, pins 4, 5 of NAND gate 190 are coupled to terminal Pl 6, pin 27, of microcomputer 24. The presence of signal on the CLEAR TO SEND line indicates the modem is signaling that it is clear to send data. Each of NAND gates 172, 178, 184, 186, 188, 190 illustratively is one-fourth of a type 1488 integrated circuit. A TRANSMITTED DATA (TD) line is coupled to an input terminal, pin 1, of an inverting amplifier 192. The output terminal, pin 3, of inverting amplifier 192 is coupled to terminal P3-1, pin 39, of microcomputer 24. The presence of signal on pin 1 of inverting amplifier 192 indicates the presence of transmitted data at the DTE coupled to pin 1. An EXTERNAL TRANSMIT SIGNAL TIMING (ETST) line is coupled to an input terminal, pin 4, of an inverting amplifier 194. The output terminal, pin 6, of amplifier 194 is coupled to a terminal P3-0, pin 5, of microcomputer 24. The presence of a signal on pin 4 of inverting ampliflier 194 indicates the existence of external transmit signal timing from the DTE coupled to pin 4. A DATA TERMINAL READY (DTR) line is coupled to an input terminal, pin 13, of an inverting amplifier 196. The output terminal, pin 11, of amplifier 196 is coupled to terminal P0-7, pin 20, of microcomputer 24. This terminal is also coupled to an input terminal, pin 3 of an amplifier 198. The presence of signal on the DATA TERMINAL READY line indicates that the DTE is ready to send data. The output terminal, pin 4, of amplifier 198 controls a DATA TERMINAL READY LED 200. Lighting of LED 200 indicates the presence of DATA TERMINAL READY signal at the input of inverting amplifier 196. Each of inverting amplifiers 192, 194, 196 illustratively is one fourth of a type 1489 integrated circuit.

Terminal P1-0, pin 21, of microcomputer 24 is coupled to an input terminal, pin 9, of an amplifier 202, the output, pin 8, of which is coupled to an LED 204. When LED 204 is lighted, high speed (1200 bps) operation is indicated. Terminal P1-1, pin 22, of microcomputer 24 is coupled to an input terminal, pin 5, of a driver amplifier 206, the output terminal, pin 6, of which is coupled to an LED 208. LED 208 is illuminated with ringing, and remains on when the modem is in the answer mode. Terminal P1-4, pin 25, of microcomputer 24 is coupled to the input terminal, pin 1, of a driver amplifier 210, the output terminal, pin 2, of which is coupled to an LED 212 to the off-hook relay coil 164. Lighting of LED 212 indicates that the modem is coupled to the telephone line. Each of driver amplifiers 174, 180, 198, 202, 206, 210 illustratively is one sixth of a type 7407 integrated circuit. Terminal P1-5, pin 26, of microcomputer 24 is coupled to an input terminal, pin 13, of an inverting amplifier 214, such as the type LS04. The output terminal, pin 12, of amplifier 214 is coupled through a resistor 216 to the base of a data/talk relay driver transistor 218, such as the type 2N2222 transistor. The emitter of transistor 218 is coupled to ground and its collector is coupled to supply voltage through the data/talk relay coil 220. Conduction in transistor 218 results in the changing of state in switches 156, 158 to permit data to be sent from the secondary winding 222 of the DAA interface through telephone jack 144 to the telephone line, assuming the off-hook relay switch 162 is closed.

The modem illustrated in FIGS. 6a and 6b can be configured to a wide variety of designs. The microcomputer 24 provides the following functions: it interfaces with the DTE (through the RS-232c interface, through TTL, etc.); it controls the mode of operation of the signal processor 26; it stores the protocol of incoming and outgoing signals. and responds to these to control the mode of the signal processor 26; it controls the LEDS 176, 182, 208, 204, 200, 212; it controls the timing of the various operations conducted in the modem; it controls, through switches coupled to its various inputs, certain options which can be selected by the user; it acts as a self-test generator for the modem; it controls the output of the signal processor 26 (e.g., mode, reset, transmit timing); it controls the scramble-descramble operation in accordance with the stored algorithm; and it acts as a serial-to-parallel converter when the modem is operating in the high speed mode as a transmitter.

The signal processor 26 responds to the configuring commands (mode select commands) provided from the microcomputer 24 to perform the following functions: FSK modulator; FSK demodulator; QDPSK modulator; QDPSK demodulator; high speed timing recovery—phase locked loop; carrier detector; and, it acts as a dibit parallel-to-serial converter when the modem is operating in the high speed mode as a receiver; line signal detection; and DTMF tone generation.

The mode in which the modem operates is commanded by signals on the D0, D1 and D2 input terminals to the signal processor 26 from the P0-0, P0-1 and P0-2 terminals of the microcomputer 24. If all three terminals are low, the modem is configured to operate as a low-speed originate modem. If the D0 and D1 terminals are low and the D2 terminal is high, the modem is configured to function as a low-speed originate modem with analog loopback. If the D0 terminal and D2 terminal are low and the D1 terminal is high, the modem is configured to function in the low-speed answer mode. If the D0 terminal is low and the D1 and D2 terminals are high, the modem is configured to function in the DTMF mode. If the D0 terminal is high and the D1 and D2 terminals are low, the modem is configured to function in the high-speed originate mode. If the D0 and D2 terminals are high and the D1 terminal is low, the modem is configured to function in the high-speed originate mode with analog loopback. If the D0 and D1 terminals are high and the D2 terminal is low, the modem is configured to function in the high-speed answer mode. Finally, if all three terminals D0, D1 and D2 are high, the modem is configured to function in the line status mode. The mode is selected when a high-to-low transition occurs on terminal P2-7 of microcomputer 24, the RST terminal of signal processor 26.

In the low-speed mode, the signal processor accepts 19.2 KHz samples (8 bits) of the FSK signal on terminal SI of signal processor 26 for demodulation. The signal processor also contemporaneously accepts transmit data on terminal D1 of the signal processor 26 for modulation. Terminal P0 of the signal processor becomes active approximately 17 msec. after receiving a carrier signal above a threshold value. Demodulated data flows out of the signal processor 26 through terminal P1. Terminal S0 of the signal processor 26 provides the modulated FSK samples (8 bits) at a 19.2 KHz rate.

Because the 19.2 KHz rate is about double the maximum frequency (10 KHz) of each of Codecs 104,106, signals are multiplexed at the 19.2 KHz rate both to and from terminals S1, S0 of signal processor 26 alternately from and to the joined terminals DX, DR, respectively of the Codecs 104, 106. Thus, each Codec operates at 9.6 KHz, half the 19.2 KHz rate, and below its 10 KHz limit, while permitting the signal processor 26 to operate at the full 19.2 KHz rate.

When the modem is configured in the DTMF mode, terminals D0, D1, D2 and D3 accept 4 bit hex digits corresponding to the dialed DTE telephone number. Terminal S0 provides 19.2 KHz samples (8 bits) of the DTMF tone pair for each digit.

When the modem is configured to operate in the high speed mode, the signal processor 26 accepts 19.2 KHz samples-(8 bits) of the QDPSK signal on terminal SI for demodulation and dibits on terminals D1, D2 for QDPSK modulation, along with dibit timing at terminal D0. Terminal P0 becomes active approximately 17 msec. after receiving a carrier above the threshold level. Terminal P1 contains both timing and data As previously discussed, timing is a high-to-low transition, nominally at a 1,200 Hz rate derived from the QDPSK signal. Demodulated data is available on the same terminal (P1) approximately 1.5 microsec. after the high-to-low going timing edge. Terminal SO provides modulated QDPSK samples (8 bits) at a 19.2 KHz rate.

In all of the above modes, the samples at terminals SI, SO of signal processor 26 are mu-law compressed to permit interfacing with the Codecs 104, 106.

When the modem is configured to operate in the line status mode, terminal P1 of the signal processor 26 indicates the presence of one of the line status tones (dial tone, ring back, busy, etc.) on the telephone line. Status tones are distinguished from each other by their repetition rates.

Figure 7:
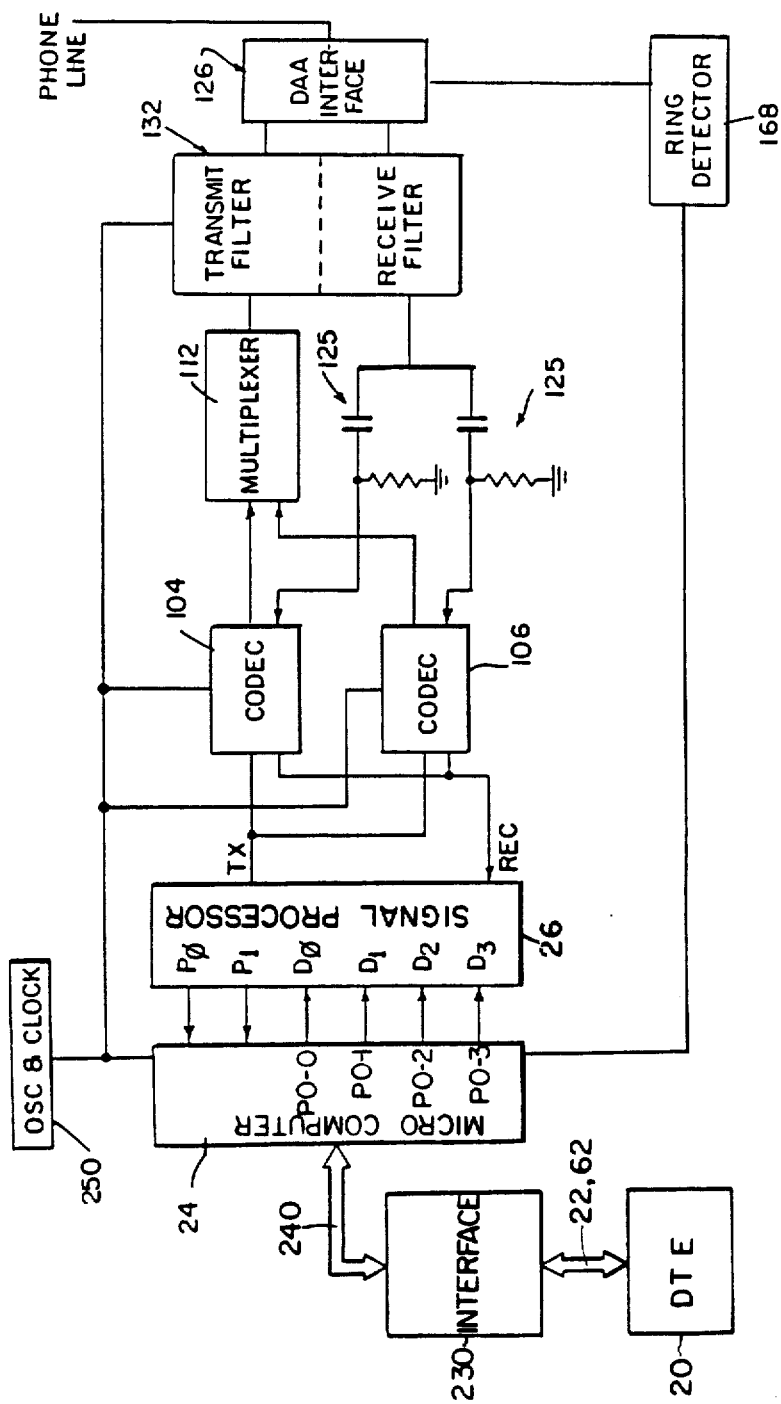
FIG. 7 illustrates a simplified block diagram useful in understanding the operation of the modem illustrated in detail in FIG. 6.

FIG. 7 illustrates a simplified block diagram useful in understanding the modem operation. Signals from and to a DTE 20 flow through coupler 22, 62 to the modem-to-terminal interface 230. This includes, for example, those components referenced in FIGS. 6a and 6b by reference numerals 172, 178, 184, 186, 188, 190, 192, 194, 196. A plurality of conductors, illustrated in FIG. 7 collectively as element 240, couple the interface to the microcomputer 24. Outgoing data and configuring signals are coupled from terminals P0-0, P0-1, P0-2 and P0-3 of microcomputer 24 to terminals D0, D1, D2 and D3, respectively, of signal processor 26. Specifically, when the modem is configured to operate in the DTMF dialer mode, all of terminals D0, D1, D2, D3 receive four bit hex digits corresponding to the dialed DTE telephone number. When the modem is configured to operate in the low-speed mode and is transmitting, serial data bits flow from microcomputer 24 through the D1 input terminal to signal processor 26. When the modem is configured to operate in the high-speed synchronous mode and is transmitting, timing information flows from microcomputer 24 through input terminal D0 to signal processor 26, bit A information flows from microcomputer 24 to signal processor 26 through input terminal D1, and bit B information flows from microcomputer 24 to signal processor 26 through input terminal D2. When the modem is receiving in the high-speed asynchronous mode, the timing is combined in the signal processor 26 with the parallel-to-serial converted bits.

In any event, the signal processor 26 provides PCM information at the 19.2 KHz frequency to both Codecs 104, 106. The Codecs 104, 106, each operating at half the 19.2 KHz frequency, or 9.6 KHz, alternately receive the PCM information and convert it to analog signals for supply to a multiplexer, such as multiplexer 112 of FIGS. 6-7. The output signals of Codecs 104, 106 are alternately supplied by multiplexer 112 to the transmit section of the 212 filter 132 (via the low-band input or high-band input, depending upon whether the modem is the originate or answer mode). The output signals from the 212 filter 132 are then furnished (again either through the low-band output or high-band output, depending upon whether the modem is the originate or the answer mode) through intervening circuitry to the DAA interface, such as the interface 126 of FIG. 6b, and to a two-wire telephone line.

When the modem is receiving data, the data comes in over the telephone line to the interface 126. Ring signal is detected by a ring detector including a circuit of the type illustrated at 168 in FIG. 6b and relayed to the microcomputer 24. Data is supplied from the DAA interface 126 through the receive section of the 212 filter 132. When the modem is operating in the originate mode, incoming information will be in the high-band, and will pass through the filter 132 from high-band input to high-band output and then through analog switches 130, 118 and amplifier 121 and RC networks 125 to the Codecs 104, 106. The two Codecs 104, 106, acting in opposite phase, analog-to-digital (PCM) convert the incoming information, and alternately supply PCM signal to terminal SI of signal processor 26. In signal processor 26 this PCM signal is demodulated and then converted to data bits. If the signal processor 26 is configured to receive in the high speed mode, the signal processor also conducts the parallel-to-serial conversion necessary to convert the dibits back into bits A and B. Carrier detect and line status information is supplied from the signal processor 26 to terminal P0-4 of the microcomputer 24. Timing and data is supplied from the signal processor 26 to terminal P3-3 of microcomputer 24. From microcomputer 24, of course, the data is supplied through connectors 240, the necessary interface 230 and coupler 62 to the DTE 20.

Clock signals for all the sampling, multiplexing and related functions are supplied from an oscillator and clock 250 including, for example, components such as those illustrated in FIG. 6 at 70, 82, 86, 88, 90, 92, 94, 96, 98, 100, 102, 108, 110.

Figure 8A:
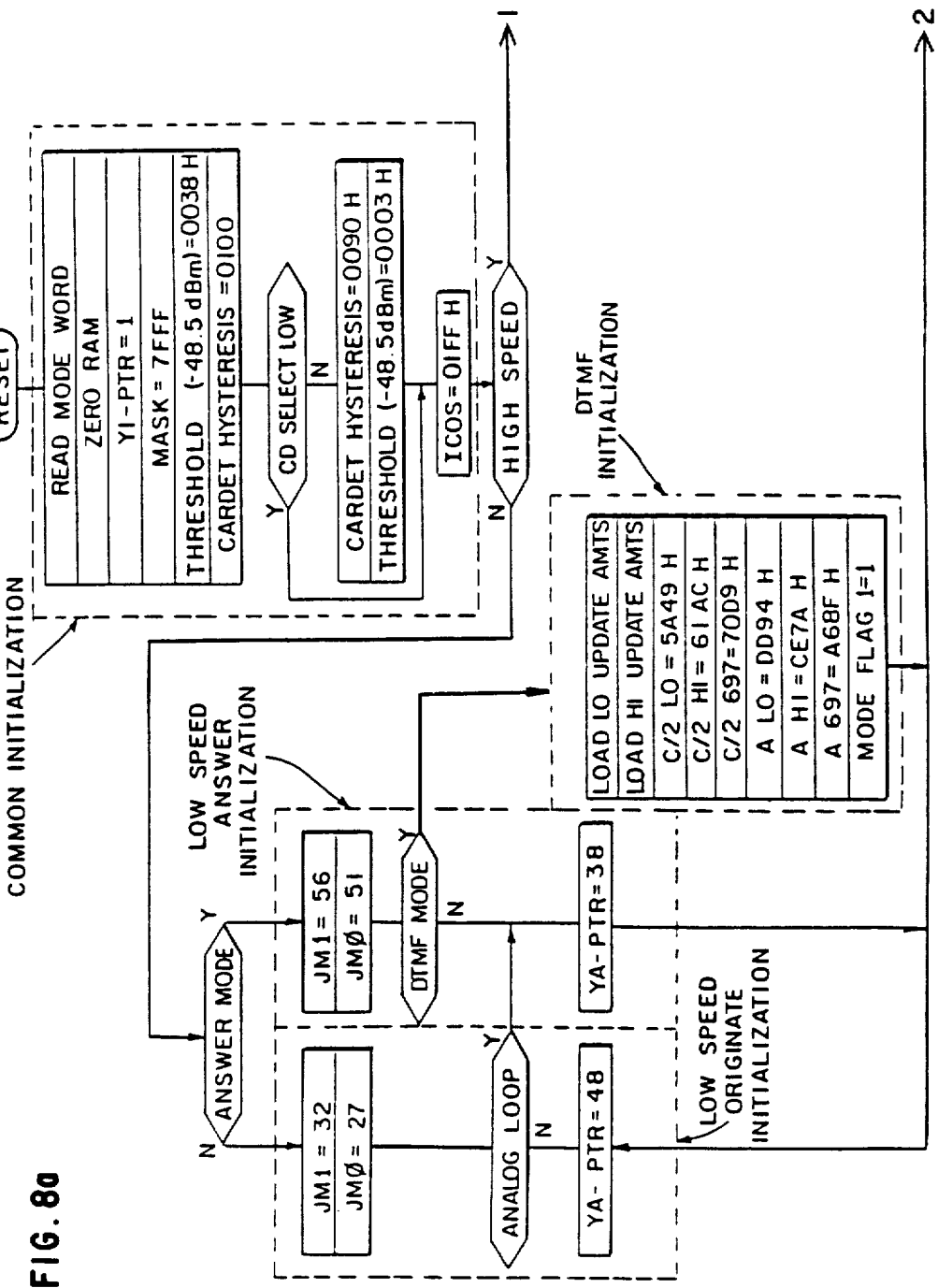
Figure 8B:
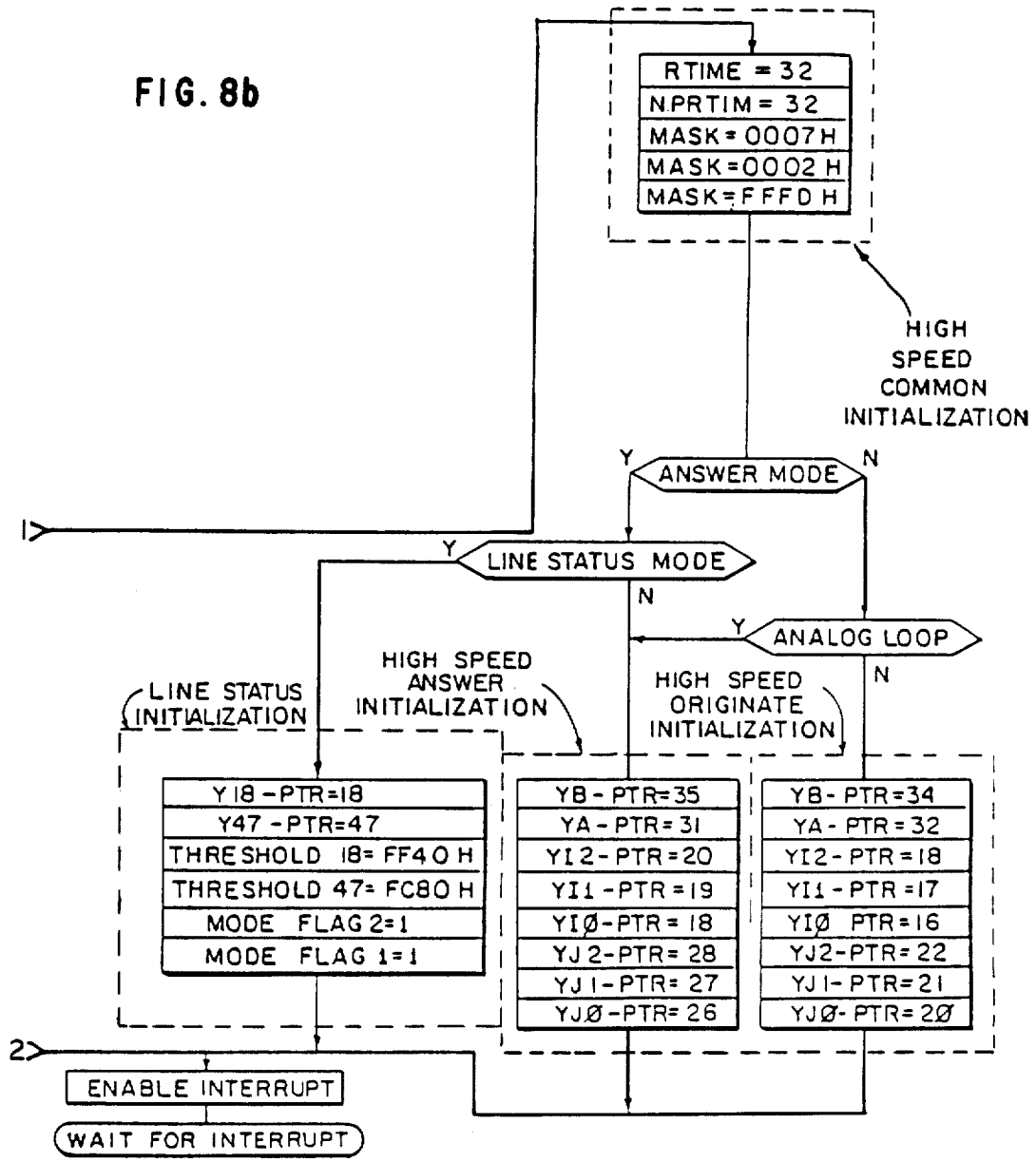
Figure 9A:
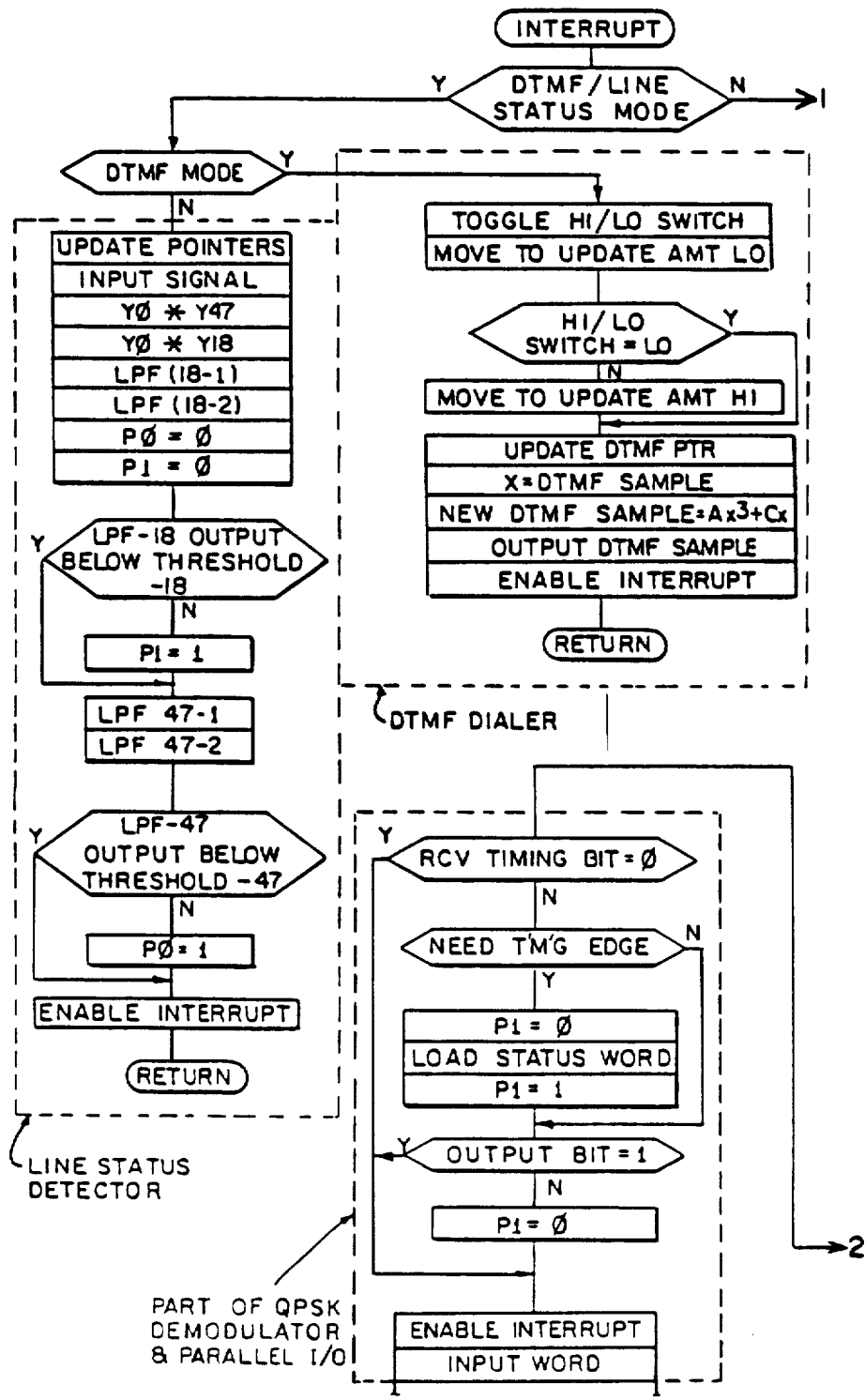
Figure 10A:
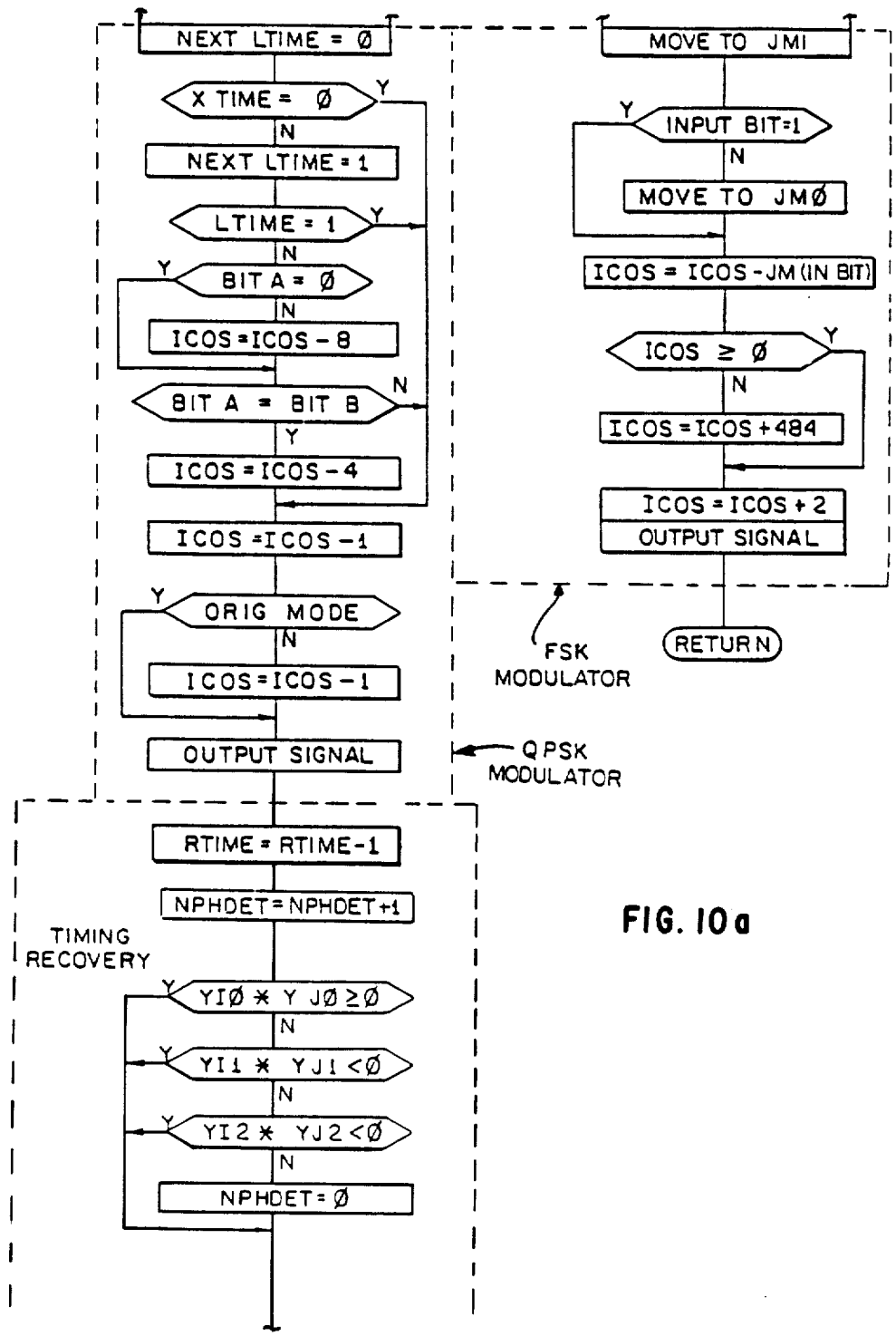
Figure 10B:
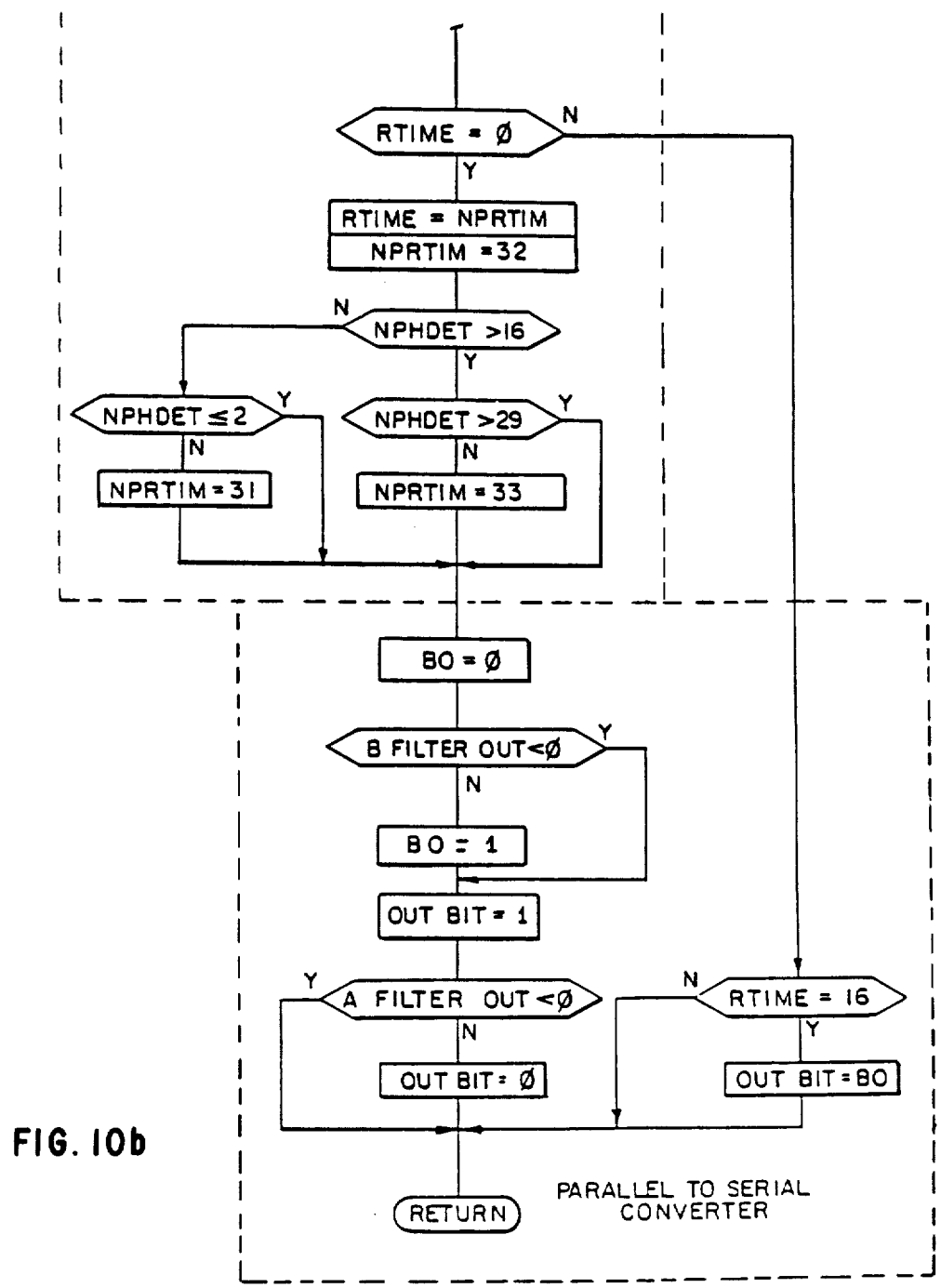

In order to understand the operation of signal processor 26, reference is made to the flow charts of FIGS. 8-10. The routine illustrated by the flow charts begins by initializing the RAM locations in signal processor 26. This is indicated by the INITIALIZATION ROUTINE and FIGS. 8a and 8b. As best illustrated in FIG. 8a, the mode configuring word from microcomputer 24 is first read from terminals D0, D1 and D2. Then the signal processor 26 internal 128 bit RAM is zeroed. Subsequently, a Y1 pointer (Y1-PTR) is set equal to one. The significance of this Y1 pointer is that it is the most recent sample to come in on the receiver.

MASK 7FFF hex clears the signal and provides an absolute value. The carrier detector has hysteresis of −45.5 dBm to −48.5 dBm. The carrier detect hysteresis lies between 0038 hex and 0138 hex. The carrier is detected at −45.5 dBm but will stay on until it drops to −48.5 dBm. The program is designed for two different carrier detect thresholds systems, depending upon system gains. The lower thresholds are 0093 hex for the upper value and 0003 hex for the lower value. These values are incorporated into the program but are not used in the illustrated system.

ICOS=01FF hex is the initial value of the cosine pointer in the RAM. Two sinusoidal waveforms are stored as normalized samples in the 512 bit data ROM of the signal processor 26. 01FF hex is the highest data ROM location, 511. The sinusoid, a sample of which is stored at address 511 is 16 samples long. That sinusoid is used to synthesize the 1200 Hz carrier or 2400 Hz carrier, depending upon whether every sample is used or every other one. At 19.2 KHz, 16 samples yields a frequency of 1200 Hz and 8 samples yields a frequency of 2400 Hz. In QDPSK, a 90° phase shift corresponds to four samples, a 180° phase shift corresponds to eight samples, and a −90° phase shift corresponds to minus four samples The next decision block is, HIGH-SPEED? Assuming the answer is NO, the program goes to the ANSWER MODE? decision block. Low-speed originate initialization is on the NO side of that decision block. The first operation in that seguence is JM1=32. There are four low-speed carriers, 1070 Hz and 1270 Hz, for space and mark, respectively, for the originate modem and 2025 Hz and 2225 Hz for space and mark, respectively, for the answer mode. A mu-law compressed, normalized sinusoid of 484 samples is stored in the signal processor 26 data ROM. If the incoming data is a low speed originate mark, the program jumps thirty-two samples on the normalized sinusoid. If the incoming data is a low speed originate space, the program jumps twenty-seven samples on the normalized sinusoid.

Similarly, if the modem is operating in the low-speed answer mode and the incoming data is a low-speed answer mark, the program jumps fifty-six samples on the normalized sinusoid. If the incoming data is a space, the program jumps fifty-one samples on the normalized sinusoid.

An ANALOG LOOP? decision is next. Analog loopback requires the program to cross over from the low-speed originate pathway to the low-speed answer pathway. Continuing, in the low-speed originate initialization, a YA pointer, YA-PTR, is set equal to 48. The most recent sample is called Y1. The initial YA pointer is 47 samples "older" than Y1.

The low-speed answer mode begins with JM1=56. Again, if the incoming data is a low-speed answer mark, the program jumps 56 samples on the normalized sinusoid. If the incoming data is a low-speed answer space, the program jumps 51 samples on the normalized sinusoid. The low-speed answer initialization routine contains a decision block DTMF MODE? If the modem is not to operate in the DTMF mode, the YA pointer, YA-PTR, is set equal to 38, or 37 samples before the current sample, in the initialization. Then the interrupt (incoming signal sample) is initiated, and the modem waits for this signal sample.

If the DTMF mode is selected, the program goes to DTMF initialization routine. In that routine, the low frequency update amounts and high frequency update amounts are loaded into the signal processor 26 RAM. The DTMF generates the dual tone multifrequency pairs for tone dialing of digits. There are 16 frequencies in the DTMF scheme, two (a low one and a high one) of which are required to dial any given digit. Thus, the signal processor 26 must generate something that looks like two sine waves at the same time. What the signal processor 26 does is to generate two pointers, a low pointer and a high pointer. The signal processor 26 updates the pointers by different jump amounts depending on what DTMF pair is to be generated in each dialed digit.

The DTMF dialer routine includes a HI/LO SWITCH which was set equal to 0 in ZERO RAM. That switch is used to control multiplexing back and forth between the two DTMF dialer tones. Rather than adding samples of the two DTMF dialer tones together, which is cumbersome, the program time division multiplexes the two required DTMF dialer tones. That is, the program generates a sample of the low DTMF tone and then generates a sample of the high DTMF tone. It should be remembered that the 484 data points from which the four low-speed frequencies (originate mark and space, and answer mark and space) and the 16 DTMF tones are synthesized is mu-law compressed. One reason why it is cumbersome to add samples of the low and high tones of the DTMF pair together to achieve a dialed digit is because the sinusoidal signal samples are mu-law compressed. The HI/LO SWITCH switches from one sample to the other, replicating both tones.

When the low-speed and high-speed carriers are generated, they are required to have a certain signal level. However, the DTMF tone levels are different by specification. The modem carriers are roughly −10 dBm, but the DTMF tones are closer to −5 dBm. Since the sinusoid samples are mu-law compressed, multiplication could not be used to adjust the level effectively. A power series approximation, $AX^3+CX$, where X is the current signal sample level and A and C are constants, was used to adjust the level. Because of the characteristics of certain filters in the system, one frequency, 697 Hz, required a separate set of level adjusting constants. 697 Hz is the lowest DTMF tone frequency.

There are two mode flags, MODE FLAG 1 and MODE FLAG 2. Both are set equal to 0 in the ZERO RAM operation. MODE FLAG 1 indicates whether the modem is operating as a modem or in the DTMF or line status mode. MODE FLAG 2 differentiates between DTMF and line status modes. MODE FLAG 1=0 is modem and MODE FLAG 1=1 is DTMF and line status. If MODE FLAG 2=0, the system is in DTMF dialer mode. If MODE FLAG 2=1, the system is in the line status mode.

Going now to the high speed initialization routine shown in FIG. 8b, it should be recalled that the clock runs the system at a 19.2 KHz rate. At 1200 bps, one dibit, or bit pair, would be 32 samples in length. Every 32 samples, the program recovers two bits from the correlators. It only sends one of those to the microcomputer 24, and then 16 samples later, it sends the other one that it has stored for a 16 sample delay interval. Thus, the parallel-to-serial conversion from dibit to bit pair is nominally conducted in 32 sample increments. Thus, a variable RTIME is initially set equal to 32.

NPRTIM=32 sets the sample rate of the phase locked loop. If the system is running in perfect phase (1200 bps) each 32 samples a new dibit is received. NPRTIM initializes the phase locked loop for perfect phase. It will be seen later that the phase may be adjusted by ±1 sample to account for the tolerance of the 1200 bps±0.01% of high speed operation.

MASK 0007 hex is examining the 3 least significant bits of the hex value of RTIME. MASK 0002 hex examines a bit out of the mode word to establish whether the transmitter is in the originate or answer mode. It is also used to send the leading edge of the timing to the microcomputer 24. MASK FFFD is exactly the reverse of the 0002 hex mask, so while MASK=0002 hex sends the leading edge of the timing, MASK=FFFD hex sends the trailing edge of the timing.

In the next decision block, ANSWER MODE?, the program goes to different routines, depending upon whether the modem is or is not in the answer mode. If the system is not in the answer mode, the program goes to a decision block LINE STATUS MODE? whether the modem is or is not in the line status mode. If the modem is in the line status mode, the line status initialization routine begins. In the line status initialization routine, the Y0 pointer was initialized to 0 in ZERO RAM. In the modem side, the current sample was referred to as Y1. In line status initialization, for convenience, it is referred to as Y0. In the first step, the Y18 pointer is set equal to 18. Thus, the next most recent sample with which Y0 is to be correlated is 18 samples earlier. The next most recent sample earlier than Y18 to be correlated to determine line status is 47 samples earlier; thus Y47−PTR =47. There are two correlators. One correlates, or multiplies, the current sample with a sample 18 earlier and the other correlates, or multiplies, the current sample with a sample 47 earlier. The line status detector routine in microcomputer 24 determines how often shift occurs in the outputs of the correlators depending on what the incoming line status is. If the incoming frequency were a single frequency, e.g., a ring back tone, a dial tone or a busy tone, the output of one of the correlators would be, e.g., 1, and the output of the other correlator would be, e.g., 0. This would correspond to one of the line status tones. The Y47 correlator, although not used in the illustrated system, is provided in the program to detect certain somewhat higher frequency line status tones, such as internal CBX error tones and internal dial tones.

Next, the thresholds above which line status tones will be considered to exist are set. THRESHOLD 18=FF40 hex and THRESHOLD 47=FC80 hex.

Finally, the mode flags for line status mode are set. MODE FLAG 1=1 distinguishes line status mode from modem mode. MODE FLAG 2=1 distinguishes line status mode from DTMF dialer mode.

If the modem is not in the line status mode, the initialization of the high speed answer mode begins. YB−PTR=35, YA−PTR=31. It should be recalled that, at exactly 1200 bps, there are 32 samples per dibit. At the 2400 Hz carrier frequency, each dibit is four cycles of the carrier in length. Thus, a ±45° phase difference at 2400 Hz would be ±1 sample from 32 samples. Similarly, at 1200 Hz, each dibit is two cycles of the carrier in length and a 45° phase difference would be ±2 samples from the 32 sample nominal dibit length. Thus, in the high speed answer mode the YA pointer and YB pointer are set to 31 and 35, respectively, while in the high speed originate mode they are set to 32 and 34, respectively. It must also be recalled that in high speed mode, what is being detected is a phase shift from the phase of the preceding dibit. Thus, in the high speed mode (both originate and answer) the program conveniently looks at three consecutive sample pairs that are exactly 180° apart in carrier phase to determine if the carrier polarity is the same or opposite. If points on the carrier are 180° apart and there is no phase shift, those samples centered at 180° prior in time would be of opposite polarity to the polarity of the current sample. Thus, in high speed answer initialization, phase comparison pointers YI0, YI1 and YI2 are set to 18, 19 and 20, respectively, which are 180° out of phase with YJ0, YJ1 and YJ2, which are set to 26, 27 and 28, respectively. It should be noted that, in high speed originate initialization, these pointers must be set at 16, 17 and 18, and 20, 21 and 22, respectively, because of the difference between the high speed originate and answer carriers. It should be noted that the program is not at this point demodulating the carrier, but rather is detecting the phase shift to update the phase locked loop. When the routine detects a certain combination of same polarity and opposite polarity of those three pairs: YI0 and YJ0; YI1 and YJ1; and YI2 and YJ2, it declares that there was a valid phase shift. Then, in every subsequent iteration, YJ2, YJ1, YJ0, YI2, and YI0 are incremented. The system is now completely initialized. It then enables the interrupt.

With reference to FIGS. 9 and 10, the system waits for interrupts in the form of a 19.2 KHz clock. When an interrupt arrives, the routine first asks if the modem is in either DTMF or line status mode. If the answer is YES, the routine asks if the modem is in DTMF mode. If the answer is NO, the system is in line status. The Y18 pointer, the Y47 pointer and the Y0 pointer are updated with every incoming sample. After the first sample, for example, Y18 pointer will point at PAM location 17, after the next sample, RAM location 16 and so on, until the Y18 pointer gets to RAM location 0 at which time it will wrap around to RAM location 64, but it will still represent Y18, the eighteenth sample before the current one. Input signal is a subroutine that inputs the signal from the serial input, an 8 bit PCM sample from the Codecs 104, 106. In the next operation, Y0 is correlated(*), or multiplied; with Y47. Y0 is next correlated with Y18. LPF(18-1) is a low pass digital filter subroutine which single pole low pass filters the correlated output. LPF(18-2) is a second serial low pass digital filter subroutine. The Y0*Y18 correlation then is low pass filtered through two single pole low pass digital filters. The output of the second of those two filters is the line status, "1" if YES and "0" if NO. In other words, if the average of all those correlations were positive, it would indicate that there is a line status tone. The way the program distinguishes among all of the different line status tones is the interruption frequency. Output terminals P0 and P1 of the signal processor 26 are zeroed. The output of LPF(18-2) is then compared to a threshold value to determine if line status has been detected. If it has, the P1 terminal is set to one to signal the microcomputer 24 of the detection of line status. Then Low Pass Filter (47-1) and Low Pass Filter (47-2), operations are performed. If a threshold is detected from LPF(47-2) terminal P0 is set to one to signal microcomputer 24.

DTMF dialer is the YES decision of DTMF MODE? TOGGLE HI/LO SWITCH, the first operation, switches back and forth between the two DTMF tones being synthesized. MOVE TO UPDATE AMOUNT LOW moves the data pointer. In signal processor 26, before any RAM location can be used, the data pointer must be moved so that it is pointing at that RAM location.

HIGH/LOW SWITCH=LOW? Both the low and high update amounts reside in the same column in RAM. The update amounts are in the bottom two rows of RAM. Assume that the tones for the dialed digit 3 are being synthesized. The update amounts for both frequencies for the same dialed digit are in the same RAM column so once the data pointer is moved to low, all that need be done is move the data pointer in that RAM column from low to high. The routine points the data pointer high or low based on the status of the high-low switch. If the switch is low, the low data pointer is updated. If the switch is high, the pointer is moved to update high. UPDATE DTMF POINTER synthesizes the sine waves for a particular DTMF frequency pair.

X=DTMF SAMPLE prepares the routine to synthesize the DTMF tones at the proper amplitudes. NEW DTMF SAMPLE=$AX^3$+CX calculates those amplitudes. OUTPUT DTMF SAMPLE outputs the synthesized DTMF frequencies at the calculated level to DTMF dial a digit.

An output subroutine loads the output into the serial output register and, as the timing commands, that serial output takes place and that 8 bit PCM code moves to the Codecs 104, 106. The input signal and output signal subroutines convert from the two's complements that the signal processor 26 uses to the code that the Codecs 104, 106 use.

Turning to the QPSK and FSK demodulator subroutine, the pointers are updated. Instead of Y18, Y47, etc., pointers, the demodulator pointers are designated the YA, YB, Y1, YI0, YI1, YI2, YJ0, YJ1 and YJ2 pointers. All 9 of those pointers are updated with 4 consecutive subroutine calls.

INPUT SIGNAL calls the subroutine for input signal. Y1* YA is the A correlator. Y1* YB is the B correlator. LOW PASS FILTER (B) digitally two pole low pass filters the B correlated output. LOW PASS FILTER (A) digitally two-pole low pass filters the A correlated output. The B output is filtered first because the A filtered output is used next by the routine. A is used in the carrier detector because A is common to both high speed and low speed. There will always be something in the A correlator even in low speed, whereas there is no B correlator output in low speed. In high speed, of course, both correlators are always used. If there is something being correlated in the correlator, be it negative correlation or positive correlation, it is rectified and filtered to determine whether or not there is carrier. Thus, the next decision block is ABS (A-OUTPUT), the absolute value of A output.

The next operation is to low pass filter the carrier detector, LPF (CARDET). The absolute value of A is rectified and must be filtered. The absolute value operation yields something that looks similar to a full wave rectified sine wave. It is low pass filtered in order to compare it to a threshold.

The next decision block is CARRIER ABOVE LOW THRESHOLD? If the answer is NO, carrier detect is set equal to 0. Another decision block is encountered, CARRIER BELOW HIGH THRESHOLD? If the answer is YES, the carrier detect equals one operation, CARDET=1, is bypassed. If the answer is NO, carrier detect is set equal to one. Either way, the P1 output is set equal to one, and the P0 output is set equal to zero. The decision block CARRIER DETECT=0? is next encountered. If the answer is YES, the operation P0=1 is bypassed. If NO, P0 is set equal to one. It should be noted that the hysteresis carrier detect scheme is in this portion of the routine. If carrier is above the higher threshold, the system operates as if there were carrier. If carrier is below the lower threshold, the system operates as if there were no carrier. Under all other conditions, the system continues to do whatever it was doing before this portion of the routine was entered.

In the next decision block, LOW SPEED? is asked. If YES, the FSK demodulator and parallel input/output routine is entered at the operation LPF (A1). The two-pole low pass filter algorithm is used here three times for a total of six poles.

The next item in the routine is a decision block, A3 OUTPUT NEGATIVE? YES bypasses a P1=0 operation. NO sets P1 equal to 0. In FSK, either one carrier frequency or the other will always be present. If the data is a space, the received frequency will be 1070 Hz or 2025 Hz. If these frequencies are being received then P1 will be 0. If the mark frequency, 1270 Hz or 2225 Hz is being received, P1 will be 1.

ENABLE INTERRUPT re-enables the interrupt. Every time an interrupt occurs, the interrupt is disabled until they are manually re-enabled. P1 and P0 don't become effective until they are loaded into the status register. P1 and P0 are actually bits that reside on the status word. The interrupt enable or disable bit also resides on the status word. The routine updates all three at the same time. ENABLE INTERRUPT conditions the system to permit the next interrupt at the 19.2 KHz sample frequency to interrupt the routine. INPUT WORD inputs the parallel word over D0, D1, D2 and D3 from the microcomputer 24.

The next operation is MOVE TO JM1 (FIG. 8c), which indicates the low speed modulator. The next decision is INPUT BIT EQUALS 1? If YES, the routine bypasses MOVE TO JM0. If NO, the routine executes MOVE TO JM0. These are the jump amounts that will be used in the sinusoid stored in data ROM.

In the next operation, ICOS is set equal to ICOS minus JM (IN BIT). The IN BIT is either a 0 or a 1. The jump amount is JM0 or JM1 where IN BIT is a 0 or a 1, respectively. Here, the routine subtracts the number of samples in the jump amount JM1 or JM0 from the ICOS pointer which is pointing at the current sample value of a particular carrier. What the routine is doing is jumping from sample to sample with the samples being spaced apart a particular number of samples determined by that particular carrier frequency. If the frequency were, for example, 2225 Hz, the routine would use JM1, or 56. ICOS will be some sample number out of that 484 sample sinusoid. The routine will subtract 56 from that to obtain the next sample of that carrier which will be sent out from the modulator.

The decision block ICOS≧0? and the operation ICOS=ICOS+484 roll over the sample value in the 484 sample sinusoid table. In other words, if the routine keeps subtracting from ICOS, it will eventually reach the bottom of the table. There is also a further corrective operation, ICOS=ICOS+2. The bottom two RAM locations in the N.E.C. 7720 signal processor 26 can be used only for testing, so the routine skips through those locations. OUTPUT SIGNAL is the signal that goes to the Codecs 104, 106.

Returning to the LOW SPEED? decision block (FIG. 8b), let it now be assumed that the answer to LOW SPEED? is NO. The routine goes to the QDPSK demodulator and parallel I/O. RECEIVE TIMING BIT=0? is the first decision block. If YES, the routine goes to ENABLE INTERRUPT. If NO, the next decision is NEED TIMING EDGE? It must be remembered that in initialization there was a variable RTIME. The received timing bit is one of the bits in that word which goes from 31, 32 or 33 to 0. The receive timing bit changes from a 1 to a 0 twice during the 32 counts. That is the bit that the routine seeks in the RECEIVE TIMING BIT? decision block. The routine is sending timing edges for the data, the 0-going edge at the beginning of the bit followed, at most, half a bit later, depending upon the bit being sent, by a 1-going edge. The timing edges are at twice the data rate. Since the baud rate is 600 (dibits per second) there will be 4 timing edges in a dibit. That receive timing bit is one of the bits in the RTIME word that is being decremented with every 19.2 KHz clock pulse. If it is not 0, then the routine goes to the decision block, NEED TIMING EDGE? Here the routine looks at the three least significant bits of RTIME, to see whether they are all 0's. All of those three least significant bits have to be 0 in order to supply a timing edge to the microcomputer 24. If any one of those bits were a 1, then there would be no timing edge to microcomputer 24 and the routine would continue. So, a timing edge is provided to the microcomputer 24 when the count is such that the 3 least significant bits of the binary count are all 0's. Every time that happens, an edge is sent to the microcomputer 24. That will happen four times in the count from 32 to 0.

After NEED TIMING EDGE? is answered YES, P1 is set equal to 0. Setting to 0 is the 0 going timing edge. P1 then is immediately reset to 1. OUTPUT BIT EQUAL 1? is the next decision block. Recall that after the zero going edge, P1 is set to 1. This decision permits P1 to go to the level the data instructs. ENABLE INTERRUPT loads the status register from accumulator B to send the edge to the microcomputer 24. Next, the parallel word is input from the microcomputer.

In the QDPSK modulator the first operation is NEXT LTIME=0. LTIME is determining if a data edge is available from the microcomputer 24. It is time to update the phase coming from the modulator when a certain polarity edge appears on the D0 line. This particular portion of the routine is monitoring D0 to detect if it went from high to low. When D0 has done that, it is time to look at the data and shift the phase accordingly.

Since the routine here is looking for an edge, it has to look not only at a sample, but also to compare it to the previous sample. The routine assumes LTIME is 0. It then asks if XTIME (the current state of D0) is zero. If XTIME equals 0 the routine skips ahead. If XTIME is not zero, the NEXT LTIME is set equal to one. The routine then asks if LTIME equals one. If YES, the routine skips ahead. If NO, the routine asks if bit A of the data equals zero. If bit A of the data equals zero, the system skips ahead. If bit A does not equal zero, ICOS is set equal to ICOS-8. ICOS-8 corresponds to a 180° phase shift. BIT A EQUAL BIT B? is the next decision block. If the answer is NO, the routine skips ahead. If the answer is YES, ICOS is set equal to ICOS minus 4. That provides a 90° phase shift Some sum of these two provides each of the phase shifts, 0°, 90°, 180° and 270° (−90°) necessary for QDPSK.

Next, ICOS is set equal to ICOS minus 1, to go from one sample of the stored sinusoidal waveform to the next sample of the stored sinusoidal waveform. In the next decision block, ORIGINATE MODE? , the routine determines whether it should decrement to the next sample of the stored sinusoid because it is in the answer mode. Thus, if the output of the decision block ORIGINATE MODE? is NO, ICOS is then decremented an additional sample to ICOS minus 1. If the output of the decision block ORIGINATE MODE? is YES, ICOS remains as previously defined. The next operation, OUTPUT SIGNAL outputs to the Codecs 104, 106 a PCM representation of a portion of the analog signal to be generated by the Codecs, be it at the 1,200 Hz originate carrier frequency or the 2,400 Hz answer carrier frequency.

Proceeding to the timing recovery portion of the routine, the receive timing variable RTIME is decremented to RTIME minus 1. This, again, is the dibit length variable and is used in the receive timing phase locked loop. Next, NPHDET is set equal to NPHDET plus 1. NPHDET counts the number of samples since the last phase shift was detected.

In the next three decision blocks, YI0* YJ0≧0?, YI1* YJ1<0? and YI2* YJ2<0? the signs of YI0 and YJ0, YI1 and YJ1, and YI2 and YJ2 are compared. If the outcome of any of these decisions blocks is YES then no phase change in the carrier was detected, and NPHDET is not set equal to zero. On the other hand, if the outcomes of all three of these decision blocks are NO, a valid phase change was detected and the phase detect counter, NPHDET is zeroed. Either way, the next decision block is RTIME=0?. RTIME is the counter that is used to determine what point in the dibit length is being considered. If RTIME equals zero, it is an indication that a dibit is ended and a new one is to be started. If a new dibit is to be started, the routine must go to the correlators and obtain the correlator outputs to assemble the next dibit which will subsequently be passed to the data processor 24. However, if RTIME is not equal to zero, the current dibit is still being processed, and the only thing that needs to be considered is whether RTIME equals 16, the beginning of the second half of the dibit. Thus, if RTIME does not equal zero, the routine next asks if RTIME=16? If RTIME does not equal 16, the routine returns to process the next sample of the received signal. If RTIME equals zero, RTIME is set equal to NPRTIM, and NPRTIM is set equal to 32, which is the nominal dibit length. In the next decision block, NPHDET>16?, the received timing is compared to nominal timing by dividing the dibit into a first half and a second half. If the answer to NPHDET>16? is NO, the routine asks, NPHDET≦2? If the answer to this question is YES, the rest of the timing recovery portion of the routine is bypassed. If the answer to this question is NO, then the variable NPRTIM is set equal to 31. Returning to the decision block NPHDET>16? if the answer is YES, the routine asks NPHDET>29? If the answer to this question is YES, the rest of the timing recovery portion of the routine is by-passed. If the answer to this question is NO, then NPRTIM is set equal to 33. It may be appreciated that this portion of the routine establishes a two-count window in either direction, fast or slow, for synchronizing the timing. Within the two-count window, either fast or slow, the variable NPRTIM will remain at nominal.

Turning now to the parallel-to-serial converter portion of the routine, it is first assumed that BO equals zero. Then a decision block B FILTER OUT<0? is reached. If B FILTER OUT is less than zero, the assumption BO=0 was correct, the answer is YES, and the next operation is by-passed. If the output of the decision block B FILTER OUT<0? is NO, the variable BO is set equal to 1. B FILTER is the filtered output of the B correlator. If this filtered output is negative, it means that the bit B to be output is zero. If, on the other hand, the filtered output of the bit B correlator is positive, it means that the bit B to be output is 1. The state of the A bit is next established. In the next operation, OUTBIT, the next bit which will be sent out, is assumed to be equal to 1. In the next decision block A FILTER OUT<0? is asked. If the answer is NO, then OUTBIT is set equal to zero. If the answer is YES, then OUTBIT remains equal to one. It should be noted that there is an inversion in this portion of the routine. That occurs because the filtered A correlator and the filtered B correlator are indicating the presence or absence of phase shifts. If the filtered A correlator output is negative, it indicates that bit A is 1.

Turning to the output of RTIME=0? in the timing recovery portion of the routine and the NO decision, the decision block RTIME=16? has been discussed briefly. This portion of the routine which couples the timing recovery and parallel-to serial converter portions of the routine is partially responsible for the parallel-to serial conversion. In this portion of the routine, the system decides whether or not it is time to output bit B recovered from the dibit. If RTIME does not equal 16, the program returns to receive the next sample. If RTIME equals 16, then OUTBIT, the next bit to be output is set equal to the variable BO previously discussed.

Turning now to FIGS. 9a-9d, and with particular reference to FIG. 9a, the routine for the Z-8 microcomputer begins with POWER UP. Next, all of the RAM in the Z-8 is zeroed, with the exception of the highest address, 7F hex.

The Z8 has several control registers to control the configuration of the ports, for example, whether the ports are inputs or outputs. At this stage of the routine, those control registers are loaded.

The routine next proceeds to read the dip switches. Most of the dip switches are provided so that a user can have his modem power up with the defaults a certain way. Most of the power up configuring can be done with the dip switches. DTR can be forced with one of the dip switches. Carrier detect and DSR can be forced with one of the dip switches. Some control characters that turn diagnostic modes on and off are enabled and-/or disabled by one of the dip switches. Disabling this dip switch makes these functions transparent to the modem so that, in case data is being sent through it, if one of the control characters occurs that otherwise would cause the modem to go into one of those modes, the configuration of the dip switches prevents that from happening. Other dip switches turn on and off loss of carrier disconnect, send space disconnect, echo command letters, response to remote digital loop, loss of carrier disconnect, auto line feed and auto answer.

The routine continues with LOAD DEFAULTS. The states of various dip switches and any software defaults are loaded into the various flag registers. The software defaults for which there are no dip switches include such items as the number of rings before the modem declares no answer. In the software, this is defaulted to 8. There is an initialize command that permits the user to reconfigure the modem to default no answer on some other number of rings, and to adjust other defaults too, such as to auto answer on the second ring rather than some other ring.

The routine continues with INITIALIZE FLAGS. There is a subroutine that is called CLEAR that sets up the command modes, that is, how the user wants some of the flag words to be initialized. CLEAR turns the transmitter, the 7720, the high speed lamp, the ring indicator lamp, DSR and carrier detect off, data talk relay to the talk position, initializes the message high address for the message to be sent, initializes the transmit buffer to all marks, turns off the diagnostic flags, sets itself up for low speed operation, and clamps the received data to a mark.

Next the routine has a decision block, START BIT TRANSITION? This begins the Z8's effort to determine what is the speed of the characters coming over from the terminal. In order to turn on the modem, it has to be sent a CONTROL Q and CARRIAGE RETURN, two ASCII characters. CONTROL Q is hex 11 on the ASCII table. While the terminal is idle (no characters coming over from the terminal), the terminal sends a constant mark condition, all 1's. If the data coming over from the terminal goes from a 1 to a 0, that is the start bit transition. 11 hex is 10001 binary. The start bit comes before the data bits. The start bit is a 0 and the first data bit of CONTROL Q is the LSB, which is a 1. The next data bits in seguence, are a 0, a 0, a 1, a 0, a 0, then perhaps a parity bit, and then a 1 stop bit. The Z8 receives the start bit transition and waits until the next bit transition. The Z8 times those first two bit transitions. If they were too fast, assuming the word was a CONTROL Q, then the Z8 knows the bit rate is higher than 1200 bits per second. The modem doesn't process anything higher than 1200 bps, so it ignores the word and waits for another one.

If the bit rate was not higher than 1200 bps, it was 1200 bps or something lower than 1200 bps. The Z8 determines what the bit rate was. It sets the baud clock to whatever nominal count the bit transitions covered. The nominal baud rates are, 1200, 600, 300, 150, 110 and 75. The Z8 sets the baud clock to one of those nominal baud rates and uses that clock to determine what the rest of the bits in the character are. The Z8 loads the rest of the bits into a register using that baud clock, then looks at what is in the register to determine if it is a CONTROL Q. To do this, the routine assumes the parity is odd or mark parity.

In the next decision block, the routine asks if the received character was a CONTROL Q WITH PARITY BIT = 1? If the answer is YES, the routine skips the next two operations. If the answer is NO, then the received character was not CONTROL Q with a parity bit equal to one. The routine then assumes even or space parity. It then asks was the received character a CONTROL Q WITH PARITY BIT = 0? If the answer is NO, then the received bit wasn't a CONTROL Q. The routine then returns to wait for another character. If the answer is YES, then the routine gets the next character. The next character should be a carriage return.

Freguently with a carriage return a terminal provides a line feed. The line feed can be either before or after the carriage return, so the Z8 ignores the line feed. Then the Z8 checks, was it a CARRIAGE RETURN WITH PARITY BIT = 1? If the answer is YES, the next two operations are bypassed. If the answer is NO the routine asks if the character was a CARRIAGE RETURN WITH PARITY BIT = 0? If not, then the character was not a carriage return. From this information. the Z8 has determined whether it will be processing signals at high or low speed, and how many bits a character contains, and configures the modem to process information in that format.

Figure 12A:
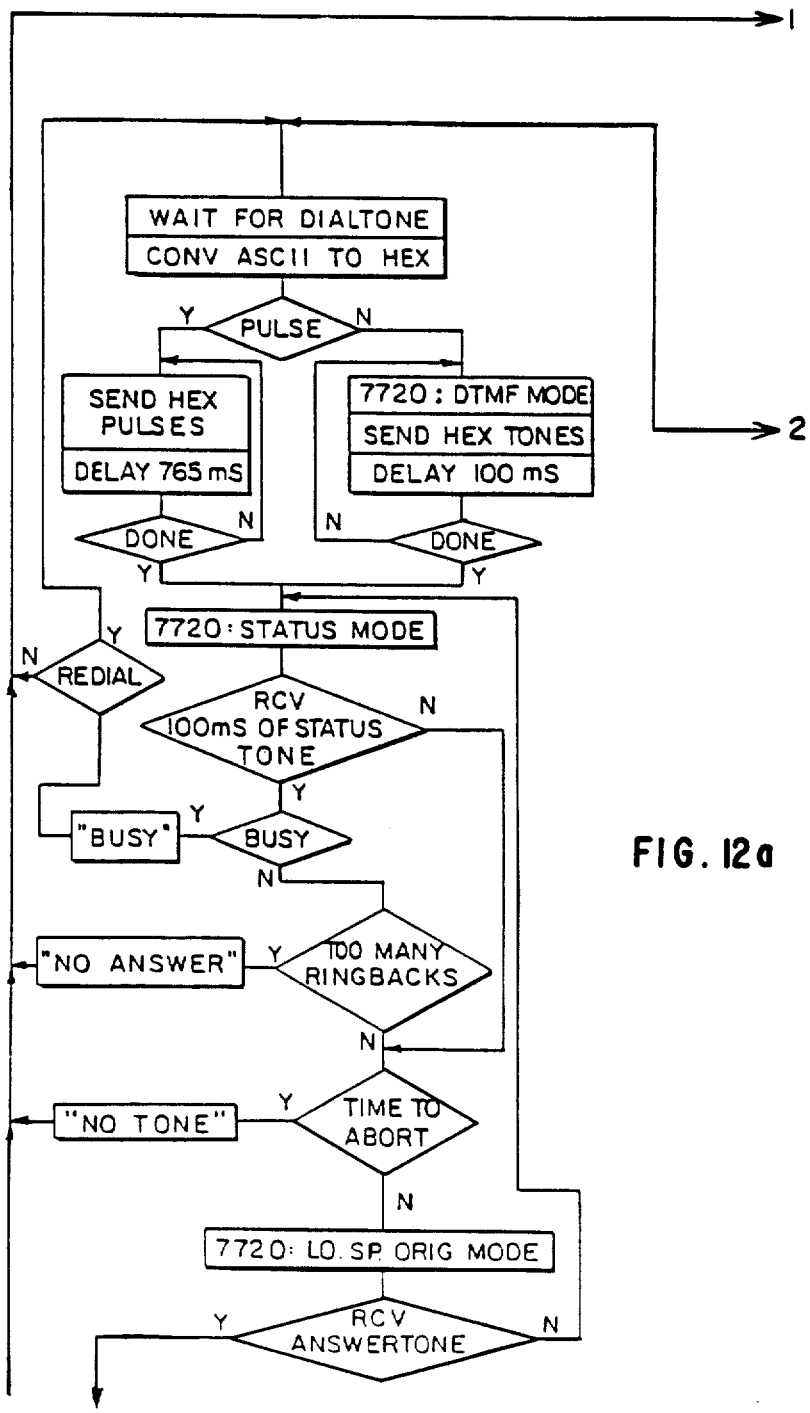
Figure 12B:
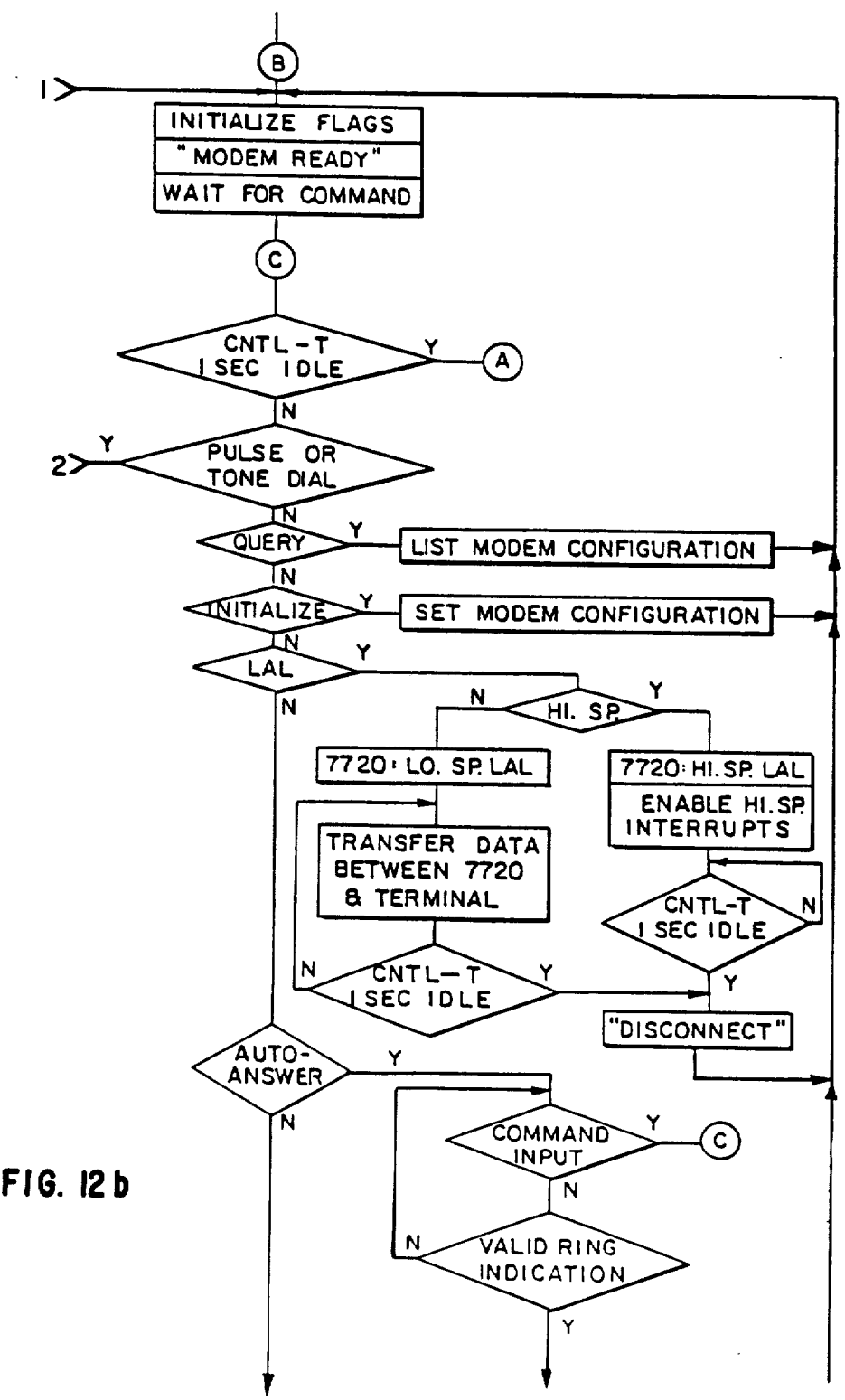
Figure 13:
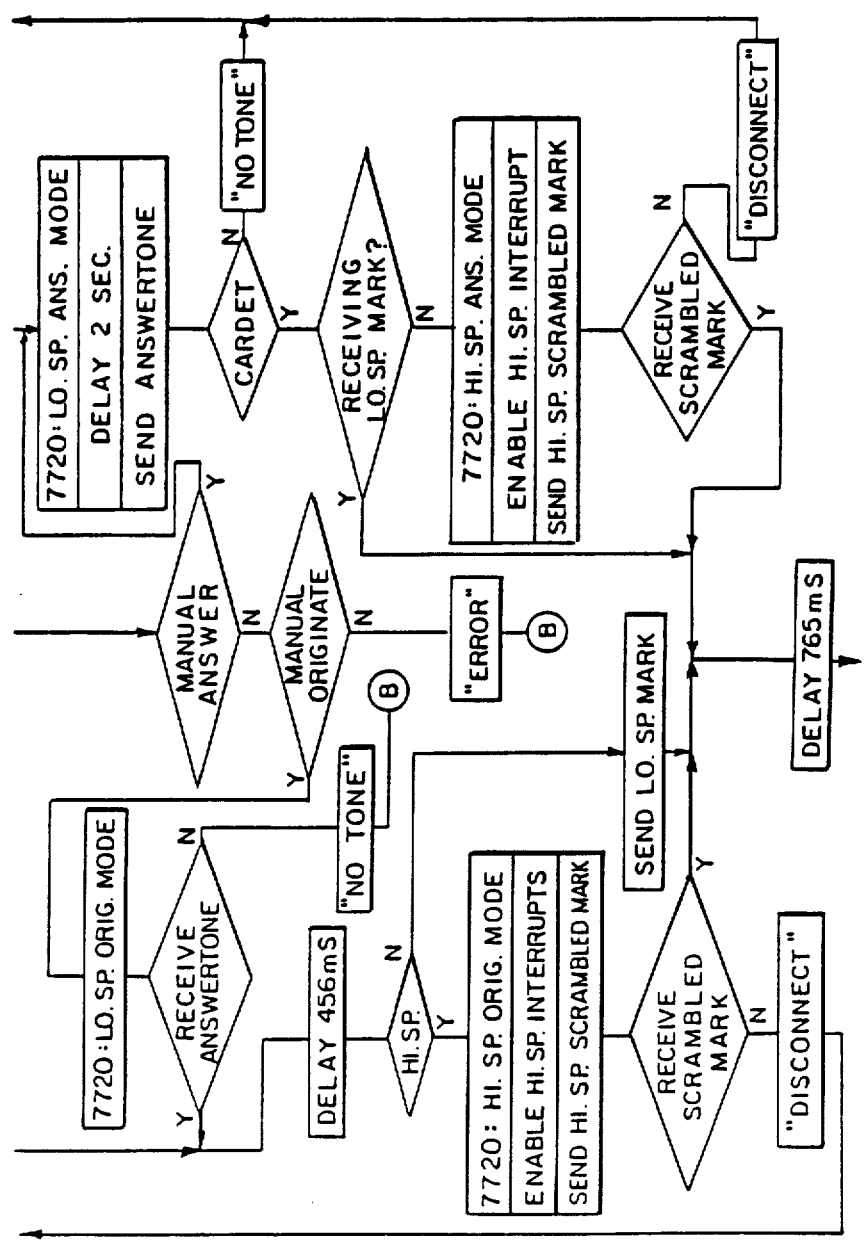

Turning now to FIG. 12a and 12b, the mode flags are initialized, or reinitialized if the routine is returning to this point from some subsequent point in the routine. Then the routine sends the "MODEM READY" message. The routine then waits for a command. It won't end its loop until it gets a start bit.

Figure 11:
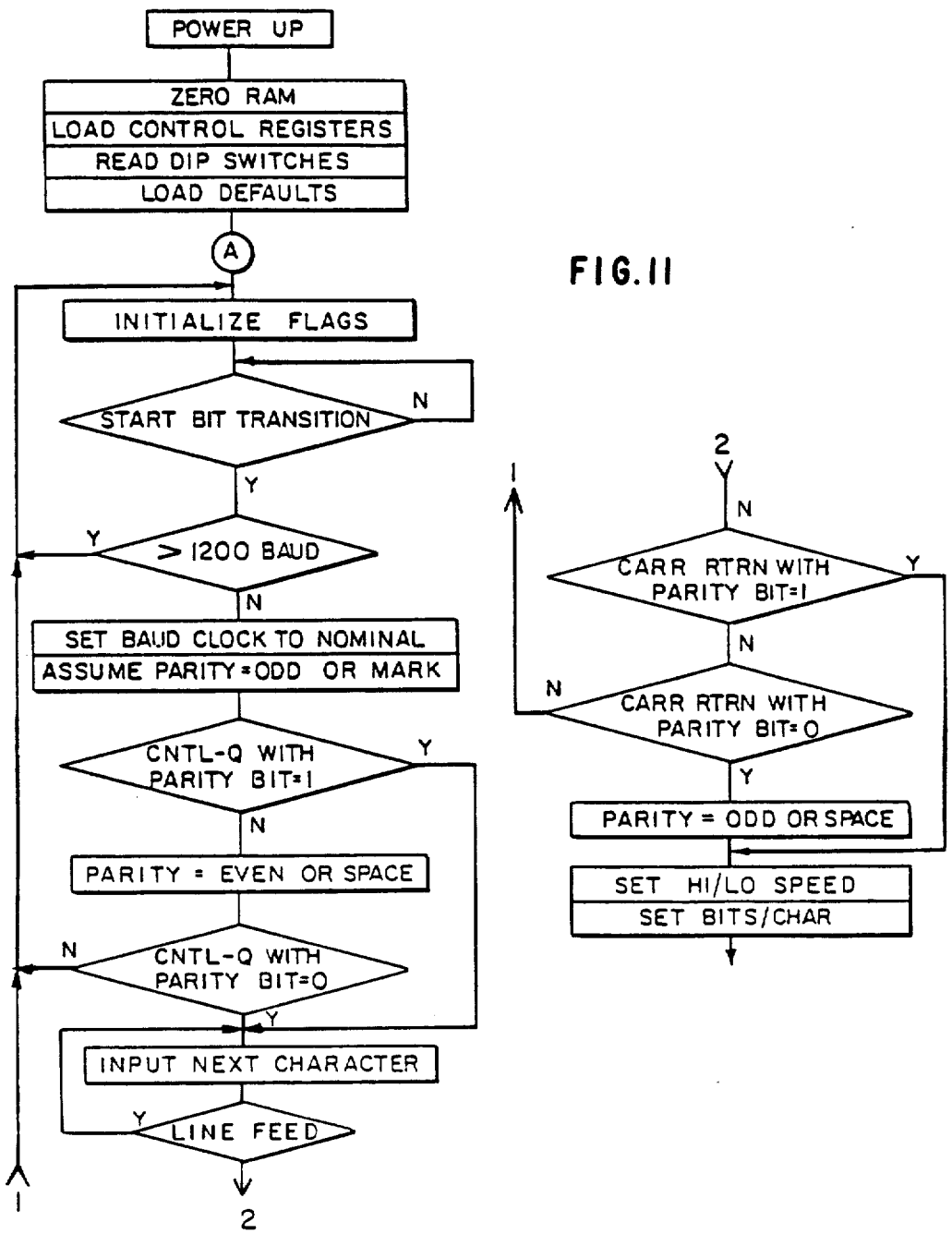
FIGS. 11, 12a, 12b, 13 and 14 illustrate a flow chart of a routine followed by the microcomputer of the modem of the present invention; and, FIGS. 15-20 illustrate flow charts of the interrupt routines which drive the routine of FIGS. 11-14 and operate the modem of the present invention.

If the command was a CONTROL T, with a one second idle, then the routine jumps to A in FIG. 11, that is the routine goes back to idle. This turns the modem off.

Next, the routine checks for the dial command, PULSE OR TONE DIAL. After the user designates pulse or tone dialing (P or T, respectively), he enters the phone number that he wants dialed and CARRIAGE RETURN. CARRIAGE RETURN sends the routine to WAIT FOR DIALTONE. After the modem receives several milliseconds of dial tone, it starts loading the phone number digits. The routine converts each digit from ASCII to hex. The routine next asks if the dialing is pulse dialing. If the answer is YES, the modem sends the dial pulses. After each dialed digit, the routine delays 765 miliseconds and then checks to see if the entire number has been dialed. If it has not, the routine goes back and gets another digit, until finally it has dialed all the digits. If the answer to the question PULSE DIALING? is NO, then the Z8 routine initializes the 7720 for DTMF mode and sends the DTMF tones. There is a 100 millisecond delay between DTMF dialed digits. The digits are sent seguentially until the routine is done.

Next, the 7720 is initialized for line status mode. Then the Z8 monitors one pin of the 7720 to determine if 100 milliseconds of any status tone occurs on it. If 100 milliseconds of status tone occurs, the Z8 determines what tone it is. The busy tone interrupt frequency is relatively higher. The ring back interrupt frequency is relatively lower. The interrupt frequency is how the modem can tell the difference between the two. If the status tone is a busy tone, the "BUSY" message is displayed and the routine determines if it is to redial. If the routine is instructed to redial, it waits for the dial tone again. The modem can be instructed to redial up to 15 times on a busy or dead line. If the line is not busy, the routine asks TOO MANY RINGBACKS? If the modem is monitoring a ring back tone and hasn't received too many ringbacks yet, the routine continues to ring. The modem can be set to any number of ringbacks. If there is no answer in that number of ringbacks, the routine sends the "NO ANSWER" message and returns to the command state (FIG. 11). Now, the routine is at the point at which it decides whether it did or did not receive a states tone. Here the routine checks the abort timer. If the abort timer times out, the "NO TONE" message is sent, and the routine returns to command state (FIG. 11). If the modem did not detect busy or too many ringbacks or abort timeout, the routine sets the 7720 into the low speed originate mode.

The next decision is RECEIVE ANSWER TONE? If the answer is YES, the routine delays for 456 milliseconds. Returning now to the PULSE OR TONE DIAL? decision block, if the answer to that question is NO, a QUERY? decision block is reached. If the answer to QUERY? is YES, the modem configuration list is displayed on the terminal. If the answer to QUERY? is NO, the terminal asks INITIALIZE? , that is, if the user wants to set the modem configuration. If the answer to the INITIALIZE? question is NO, the routine asks if the modem is in the LOCAL ANALOG LOOPBACK? mode. If the answer to LAL? is YES, the routine next asks if the modem is in HIGH SPEED? If it is in low speed, then the 7720 is set to low speed analog loopback. A subroutine is then called that transfers the data back and forth between the 7720 and the terminal. When the Z8 gets a CONTROL T with a one second idle to end that mode, the routine returns to command state via "DISCONNECT."

The YES answer to HIGH SPEED? takes the modem along a similar path through the routine. The 7720 is set to high speed local analog loopback. In this case, instead of having a subroutine that transfers data, the routine must go through the high speed interrupts because of the logic involved in, for example, reinserting missing stop bits, break sequences, and the like. Once again, CONTROL T with a one second idle gets the modem out of that mode and back to the command state via "DISCONNECT." If the answer to LAL? is NO, the routine asks AUTO ANSWER?

If the answer to AUTO ANSWER? is NO, the routine goes to MANUAL ANSWER? The YES decision takes the routine to the auto answer mode. Upon receipt of a valid ring indication, or the manual answer command, the 7720 is configured in the low speed answer mode and a two second delay is provided for carrier billing protection. The routine then sends the answer tone. The modem waits to detect carrier from the other end. If no carrier is detected before the abort time out, the routine sends the "NO TONE" message and returns to command state. If carrier is detected, then the routine confirms it is receiving the low speed mark. If it is not receiving a low speed mark, the 7720 is reconfigured to the high speed answer mode. It enables the high speed interrupts, sends a high speed scrambled mark and waits for so many milliseconds to receive a high speed scrambled mark. If it receives the high speed scrambled mark, then the protocol sequence is completed. If it does not receive the high speed scrambled mark, then it sends the "DISCONNECT" message and returns to the command state. Assuming the high speed scrambled mark was received, the routine delays for 765 milliseconds.

Returning now to the MANUAL ANSWER? decision block, if the answer to that question is NO, the next decision block is MANUAL ORIGINATE? If the answer to MANUAL ORIGINATE? is NO, there must have been an error. The "ERROR" message is displayed and the routine returns to command state. If the answer to MANUAL ORIGINATE? is YES, the 7720 is set to low speed originate mode and waits to receive an answer tone from the answer modem. If no answer tone is received, a "NO TONE" message is displayed and the routine returns to command state. If answer tone is received, the routine delays for 456 milliseconds. Then a decision block HIGH SPEED? is encountered. The routine determines if the flag is set for high speed. If it is set for low speed, the routine sends the low speed mark, the originate modem completes its protocol, and delays for 765 milliseconds.

If the flag is set for high speed, the 7720 is reinitialized for high speed originate mode, the high speed interrupts are enabled, and a high speed scrambled mark is sent. The routine then waits to receive the scrambled mark from the answer modem. If the high speed scrambled mark is not received, the "DISCONNECT" message is sent and the routine returns to command state. If the high speed scrambled mark is received, then protocol is passed and the routine goes to delay 765 milliseconds, the "end" of the protocol phase. The routine next asks if the modem is configured for HIGH SPEED? If low speed, then the routine transfers data back and forth between the 7720 and the terminal. The routine checks for RECEIVE SPACE DISCONNECT? The 212 protocol requires the modem to disconnect after 1.6 seconds of space.

If the answer to HIGH SPEED? is YES, then data is sent back and forth. Additionally the routine must check for digital loop (DL), remote digital loop (RDL) or responding to remote digital loop (RRDL). If the routine goes into digital loop or responding to remote digital loop, then the modem sends the received data back as transmitted data in the other band. In the case of RDL, the local modem is requesting that a remote modem mirror transmitted data back to the user.

RECEIVE SPACE DISCONNECT? As mentioned before, if the modem receives 1.6 seconds of space, it outputs the "DISCONNECT" message and disconnects. If the modem loses carrier, it outputs the "DISCONNECT" message and disconnects. If carrier is not lost, the routine next asks if DATA TERMINAL READY is lost. If the answer is NO, the routine returns to the HIGH SPEED? decision block. If the answer is YES, the routine asks if SEND SPACE DISCONNECT is enabled. In the case of loss of DTR, the routine checks the flags to determine if the local modem is to send a space disconnect. In the case in which the local modem receives a space disconnect from the remote modem, there is no point in sending a space disconnect, because the remote modem has already sent one, and has likely already disconnected. In the case of loss of carrier, if there is no carrier, the local modem is not communicating with the remote modem anyway, so again, there is no need to send a space disconnect. However, in the case of loss of DTR, the local modem is the one attempting to disconnect the call, so the routine checks the flags to determine if the local modem is supposed to send the space disconnect. If the send space disconnect is enabled, a space disconnect is sent. Then the "DISCONNECT" message is displayed and the routine returns to command state.

Figure 14:
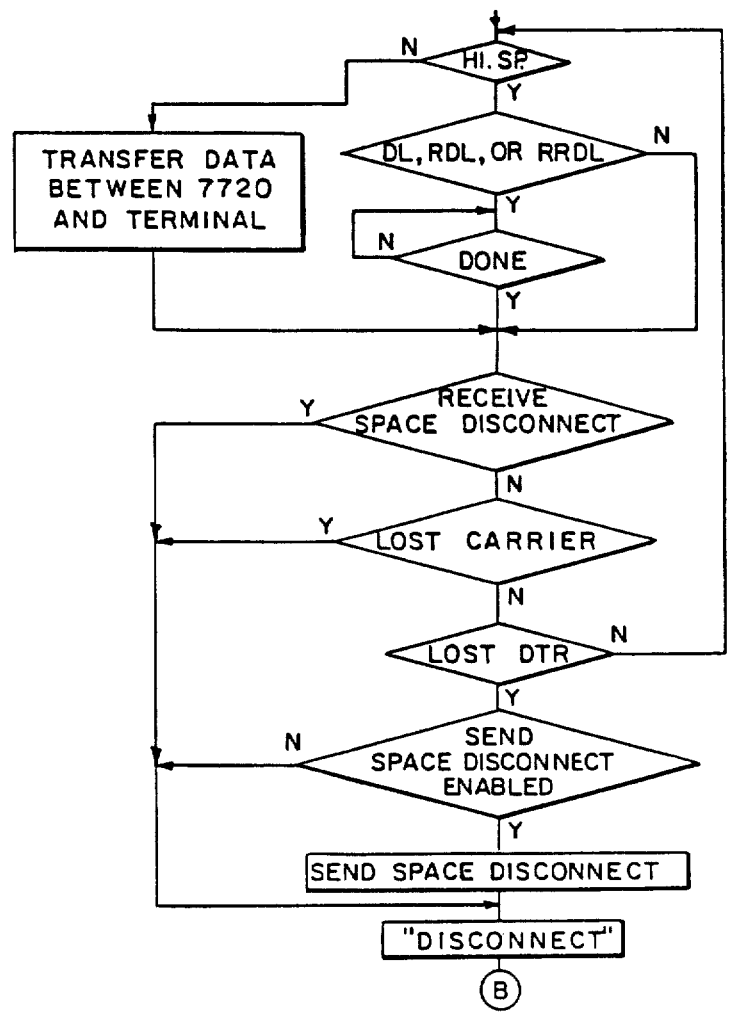

Turning now to FIGS. 15-20, the interrupts which drive the Z8 routine will be discussed briefly. Essentially every thing in high speed mode, whether it is synchronous or asynchronous, is handled inside the interrupts because all high speed operations require timing. In low speed mode, the routine doesn't need timing because low speed data is FSK, and is easily handled in real time. In low speed, there are no stop bits to delete, dibits to decode and reassemble into bit pairs, no timing signals, etc. In FSK, if one frequency is being transmitted or received, the data is a one, if the other frequency is being transmitted or received, the data is a zero. In high speed, the modem derives timing from the phone line and sends it to the terminal over the interface in the case of synchronous mode operation. In asynchronous mode operation, the modem must count bits in the character and determine whether or not it has to reinsert missing stop bits, and so on. So high speed operation is handled with interrupts, except as specifically provided in the main routine discussed in connection with FIG. 14.

Interrupt 2 is illustrated in FIG. 15. Interrupt 2 is controlled by the transmit data from the terminal. Interrupt 2 is enabled whenever the modem is waiting for a start bit. Interrupt 2 is mutually exclusive with interrupt 4, which will be discussed in connection with FIG. 10c. If interrupt 2 is on, then interrupt 4 will be off, and vice versa. If interrupt 2 is enabled, that means the modem has detected the start transition of a character. The interrupt 2 routine first determines if the modem is in digital loop or responding to remote digital loop. If it is, the interrupt 2 routine returns until the priority routine DL or RRDL is complete. It may be recalled that in DL and RRDL the local modem is looping data back to a remote modem and the local modem is not supposed to respond to anything but loss of carrier from the remote modem. If the modem is not in DL or RRDL, the interrupt 2 routine disables interrupt 2 because the only 1-to-0 transition that needs to be detected in any character is the first one, the start transition. There may be many other 1-to-0 transitions in a character that interrupt 2 does not want to recognize here, so it disables itself.

Then, timer 0, which the routine uses for transmit timing is set so that it interrupts in half a bit time from the present and every bit thereafter. Interrupt 4 is thus set so that it interrupts in one half a bit time and then exactly one bit time after that until the end of the character, because interrupt 4 is the interrupt that transfers bits into the transmit buffer. Then the interrupt 2 routine sets the transmitter bit count to the number of bits per character so that interrupt 4 will have the data format.

Interrupt 0, illustrated in FIG. 16, is coupled to P3-2, pin 12 on the Z8, which is driven by the 1200 Hz signal from the crystal oscillator. The first item in interrupt 0 is to update some timers that are running at the 1200 Hz rate. Those timers are delay timers, such as the 765 milliseconds delay timer, the wait 2 seconds timer, and so on. Then the interrupt 0 routine asks if the data is LOW SPEED OR SYNCHRONOUS? If the answer is YES, the routine returns from interrupt 0. If the answer is NO, then the data must be high speed asynchronous. The interrupt 0 routine next asks SELF TEST? This is where the modem generates its self test pattern. The modem's self test pattern starts at an ASCII zero and goes sequentially to ASCII W, so it has 40 characters. Then it starts over again. If the modem is not in self-test, or once the modem has updated the self test pattern, interrupt 0 scrambles the transmit data, and sends it to the 7720. Finally, the interrupt 0 routine inserts extra stop bits if necessary. Then control is returned to the main routine of FIG. 14.

The asynchronous transmitter uses interrupt 0 and interrupt 4. Interrupt 4 inserts bits into the transmit buffer. Interrupt 0 removes bits from the transmit buffer, scrambles them and sends them to the 7720. If the terminal is in idle, the modem is in a marking state, so there won't be any start bits to trigger interrupt 4. However, interrupt 0 will be rotating bits out of the transmit buffer all of the time in normal operation. Once the bits that are rotated through the transmit buffer get to a certain point, the routine recognizes that no characters of transmit data have arrived lately. This drives the routine into a mode in which it starts inserting extra stop bits (marks) into the transmit buffer. That happens in data terminal idle mode when characters are not being transmitted.

Figure 17:
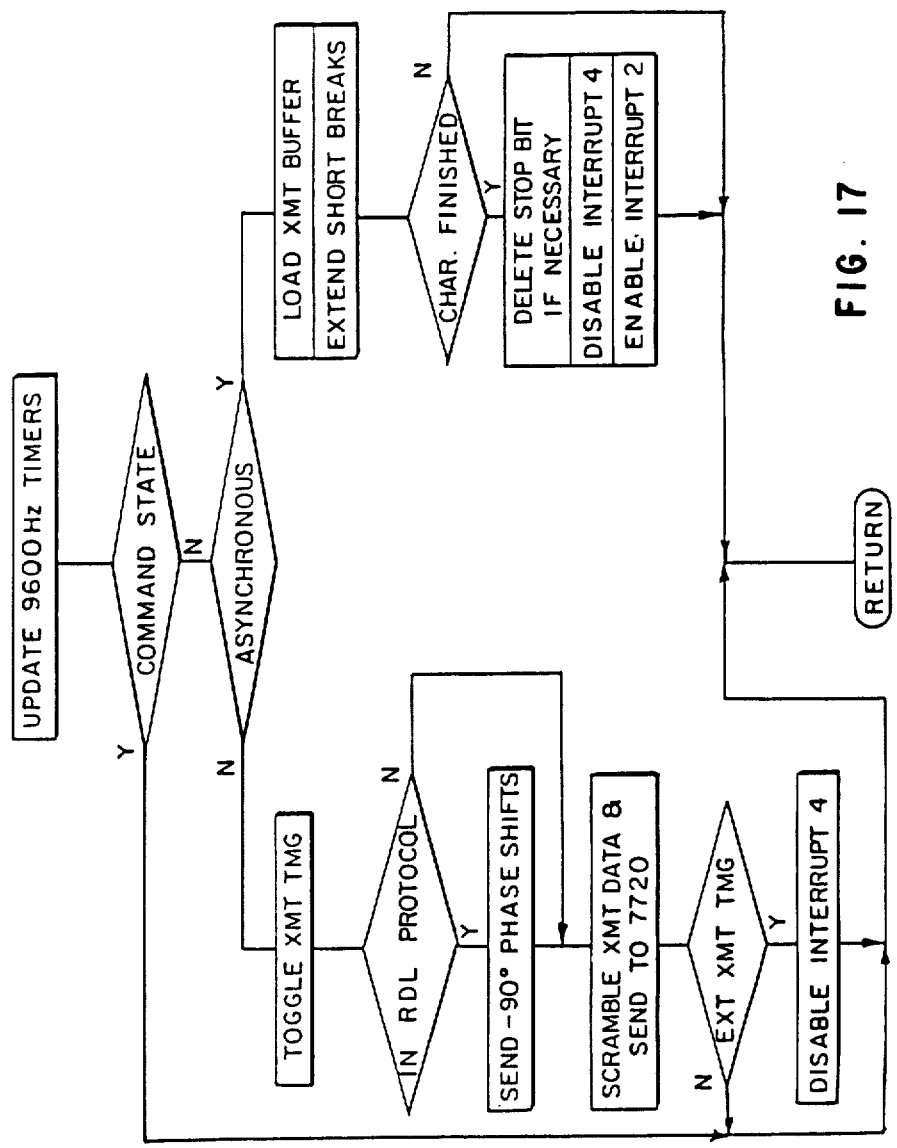

With reference now to FIG. 17, interrupt 4 will be discussed. In the synchronous mode, interrupt 4 is the transmit phase locked loop timer at 2400 Hz. In the asynchronous mode, interrupt 4 is the resettable 1200 Hz clock. Interrupt 4 transfers bits of transmit data into the transmit buffer. The interrupt 4 routine first updates the 9600 Hz timers. These timers control the messages to the terminal and inputting of characters from the terminal. Whatever the baud rate is, the interrupt 4 routine knows how many counts to count between bits so that it can pull in characters or send characters to the terminal. It performs these functions in 9600 Hz steps instead of 1200 Hz steps. The interrupt 4 routine asks if the main routine is in COMMAND STATE? If it is not in command state, it is in one of the on line states. If it is in command state, then the routine returns from interrupt 4, because the interrupt 4 routine needs only to update the 9600 Hz timers.

If the main routine is in an on line state, then the interrupt 4 routine must determine whether the on line state is synchronous or asynchronous. If it is asynchronous, the interrupt 4 routine takes the incoming bit and loads it into the transmit buffer. Then the interrupt 4 routine determines if the flag is set that indicates the routine is in a break that is short one or more bits. To be compatable with 212 modems, if there is a break and there are 10 bits per character, the break must be at least 23 or 24 bits. If there is a break and characters contain 9 bits per character, the break must be at least 21 or 22 bits. If the break is shorter than that, then the break is too short and the remote modem could conceivably interpret the break as being two "all zero" characters, all space characters with a deleted stop bit between them. To prevent that from happening, the transmitter forces the break to be a bit longer than two all space characters with a deleted stop bit between them.

After the interrupt 4 routine extends short breaks, then it checks the counter to see if the character is completed. If the character is not complete, the interrupt 4 routine returns. If the character is finished, then the interrupt 4 routine checks a pointer that is pointing to a certain bit in the transmit buffer. There is a nominal position for the pointer. If it is too far one way or the other, the interrupt 4 routine interprets the pointer location as a data rate that is either too fast or too slow. If that pointer is in the direction of too fast, in other words, if the bit rate is slightly above 1200 bps, then occasionally the routine must delete a stop bit. To do this, interrupt 4 disables itself and enables interrupt 2.

As previously mentioned, interrupt 4 in synchronous mode is the transmit phase locked loop timer at 2400 Hz. In asynchronous mode, interrupt 4 is the resettable 1200 Hz clock. In synchronous mode, interrupt 4 is enabled in high speed except with synchronous slave timing, in which case timing is obtained in the receive synchronous interrupt, interrupt 5, which will be discussed subsequently. In synchronous mode, there is somewhere a transmit clock, either internally on the modem, being generated by the 1200 Hz interrupt, or externally, from the terminal or computer and being sent with the incoming data for transmission. In either case, there is a source for the transmit timing, and that transmit timing source drives interrupt 4.

If the timing is internal, the modem supplies the timing itself and tells the terminal when to give the modem a bit. On the RS 232 interface, one of the pins is transmit timing. Transmit timing is a 2400 Hz interrupt, so if the modem is to send a 1200 Hz square wave, it toggles one way on one interrupt and the other way on the next interrupt, resulting in a 1200 Hz square wave. Next, the interrupt 4 routine determines if the modem is in remote digital loopback (RDL) protocol. If the modem is in RDL protocol, the interrupt 4 routine signals the remote modem to initiate RDL. This is done by the local modem by sending minus 90° phase shifts to the remote modem.

As soon as the remote modem detects minus 90° phase shifts for a predetermined time period, it responds by sending a scrambled dotting pattern, 10101010, back to the local modem. When the local modem detects the scrambled dotting pattern, then it sends scrambled marks to the remote modem. The remote modem detects the scrambled marks and starts looping them back. As soon as the local modem detects its own scrambled marks, then it knows the remote modem is looping the data back. If the local modem is not in RDL protocol, or if the minus 90° phase shifts have been sent, the interrupt 4 routine next goes to SCRAMBLE TRANSMIT DATA AND SEND TO 7720. Then, if the modem is not in external transmit timing, control is returned from interrupt 4 to the main routine. If the modem is in external transmit timing, interrupt 4 is disabled and control is returned from interrupt 4 to the main routine.

In synchronous external timing, interrupt 4 is enabled in interrupt 3. Interrupt 3, FIG. 18, is on the pin of the Z8 which is coupled to the RS 232 interface. If interrupt 4 is in synchronous mode, it is driven either by external timing or by the modem's own internal timing. If the modem is receiving external timing, the terminal or computer is supplying the timing to the modem with data. The modem must phase shift the timing one-half bit time later than the received 1-to-0-going timing so that the modem can get to the centers of the transmit data bits. In other words, the transmit timing edges occur in the centers of the data bits. Therefore, interrupt 3 sets T0 to interrupt half a bit later and then enables interrupt 4. Now, it should be recalled in the synchronous mode, interrupt 4 is the transmitter phase lock loop timer. Interrupt 1 controls the phase lock loop in synchronous mode. Interrupt 1 is enabled in high speed. The interrupt 1 routine will be discussed with reference to FIG. 19.

Interrupt 1 is driven by the received multiplexed timing and data from the 7720. The interrupt 1 routine first gets the received data from the 7720 and descrambles it. Then interrupt 1 determines if remote digital loopback is enabled. If RDL is enabled, then the interrupt 1 routine looks for the scrambled dotting pattern. In other words, if the interrupt 1 routine has reached this point, then it is in the middle of RDL protocol. The local modem is trying to place the remote modem in RRDL. If the local modem detects scrambled dotting pattern, then a flag is set. The interrupt routine next determines if the local modem is responding to a remote digital loop. If RRDL is enabled, then the local modem waits for minus 90° phase shifts from the remote modem. Next interrupt 1 asks if the modem is in synchronous or asynchronous mode. If it is in asynchronous mode, control is returned from interrupt 1 to the main routine. If the modem is in synchronous mode, then the receiver phase locked loop, timer 1 (T1), which is interrupt 5, is updated. Here the receiver PLL is either speeded up or slowed down as necessary.

Figure 20:
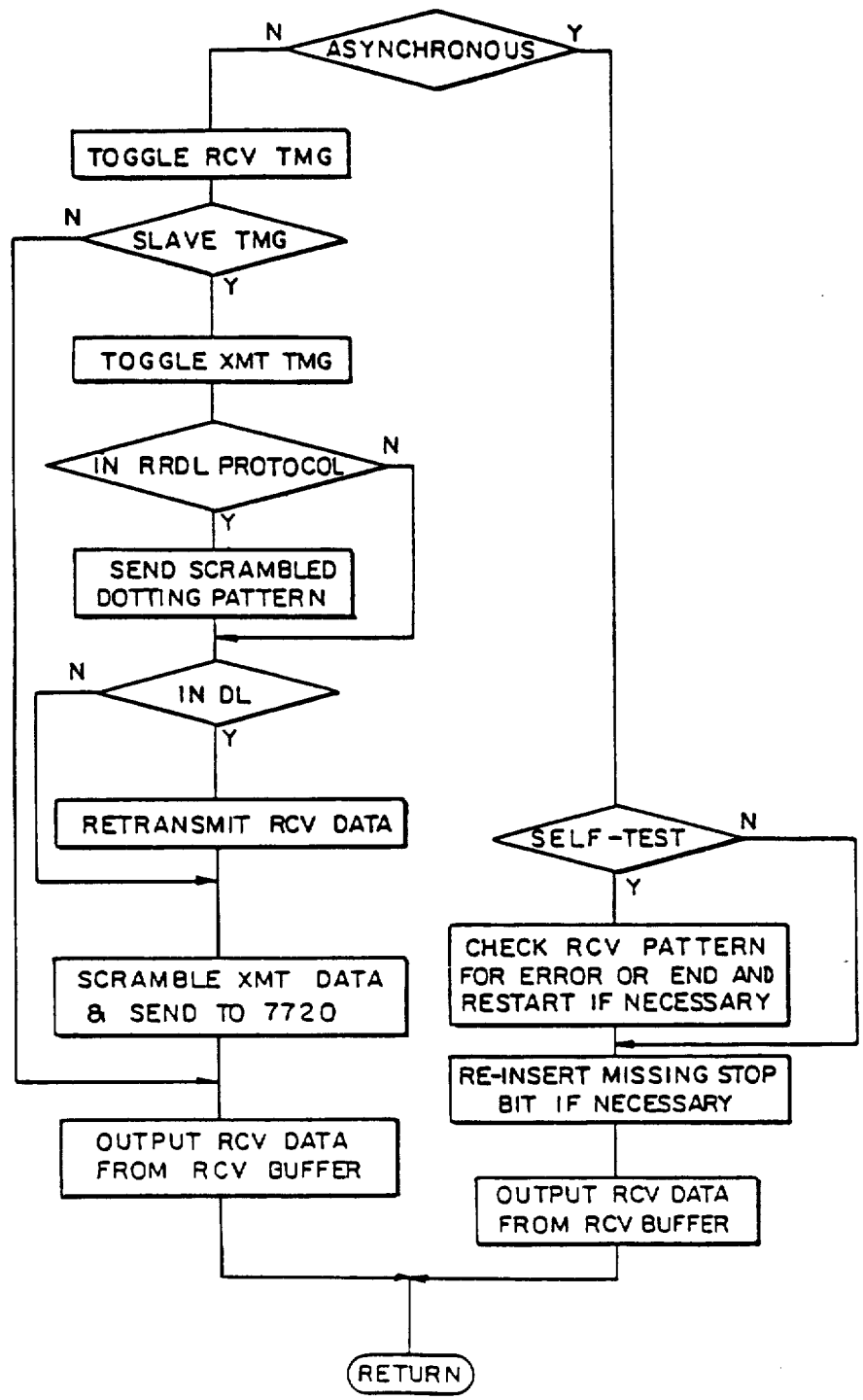

Interrupt 5 is the T1 timer. Interrupt 5 is always enabled in high speed whether the modem is in the synchronous or asynchronous mode. If the modem is in asynchronous mode, interrupt 5 is the 1200 Hz receive baud clock. If the modem is in synchronous mode, interrupt 5 is the receiver phase locked loop timer at 2400 Hz, which can be speeded up or slowed down. With reference now to FIG. 20, asynchronous mode will be discussed first. First, interrupt 5 determines if the modem is sending a self-test pattern. If it is, one of the things that the self-test pattern does is enable the user to check if there are any errors over the local system, the phone line and the remote modem. The self-test pattern is sequential, starting at ASCII 0 and continuing sequentially through the ASCII table to ASCII W. The next character should always be one ASCII character higher than the previous one, except of course when the self test pattern is wrapping around from ASCII W to ASCII 0. Self-test tests that pattern. If there is an error in the self test pattern, the routine restarts the pattern, so the user can tell immediately by looking at the display that there was an error.

Next, the interrupt 5 routine determines if it must reinsert any missing stop bits that the remote transmitter has deleted. The local modem reinserts any missing stop bits. Finally, the interrupt 5 routine outputs received data from the receive buffer to the RS 232.

If the modem is in the synchronous mode, interrupt 5 toggles the received timing. That is a divide-by-two operation. The interrupt 5 routine next asks if the modem is optioned for slave timing. If there is not slave timing, interrupt 5 jumps to OUTPUT RECEIVED DATA FROM RECEIVE BUFFER. After that, control is returned to the main routine. If there is slave timing, interrupt 5 toggles the transmit timing. If the modem is in RRDL protocol, interrupt 5 sends the scrambled dotting pattern. If the modem is in digital loop, interrupt 5 retransmits the received data. Then interrupt 5 calls the subroutine to scramble the transmit data and send it to the 7720 as dibits. Finally interrupt 5 reaches the point where it can handle the received data, so it outputs the received data from the receive buffer to the RS 232 and returns control to the main routine.

What is claimed is:

1. A telephone network between an originate modem and an answer modem, at least one said modem comprising a two speed, full duplex modem for transmitting and receiving analog signals through said telephone network, said full duplex modem comprising:

(a) a data terminal means for transmitting and receiving digital data;
(b) a microcomputer means in communication with the data terminal means;
(c) a signal processor means in communication with the microcomputer means, said signal processor means further providing a means for storing a plurality of digital data samples corresponding to a sinusoidal waveform;
(d) a converting means in communication with the signal processor means for converting digital data from the signal processor to the analog signal for transmission over the telephone network, and for converting the received analog signal from the telephone network to the digital data;
(e) a filter means in communication with the converting means and the telephone network for filtering the analog signal for transmission between the converting means and the telephone network, and for filtering the received analog signal; and
(f) a selecting means in communication with the microcomputer means for selecting a bit rate mode using the digital data from the data terminal means; said selecting means further providing a means responsive to the bit rate of the originate modem, to selectively communicate either a relatively higher bit rate by differential phase shift keying, or a relatively lower bit rate by frequency shift keying; the selecting means further providing a means for selecting digital data samples at intervals determined by the bit rate mode, to synthesize the digital data modulated for transmission through the converting means to the analog signal for transsission through the filter means over the telephone network for communication between the originate modem and the answer modem.

2. The modem of claim 1, wherein the signal processor means further comprises a means for selecting the digital data samples at intervals determined by a dialed digit stored in the microcomputer means to generate a tone pair for transmission through the converting means to the telephone network.

3. The modem of claim 2 wherein the means for selecting samples at intervals determined by a dialed digit to generate a tone pair comprises a means for dividing a time base into substantially equal first and second alternating intervals and for selecting at intervals to generate a sample of one of the tones of the pair during alternate first intervals, and for selecting at intervals to generate a sample of the other tone of the pair during alternate second intervals.

4. The modem of claim 3 wherein the tone pair is a DTMF pair.

5. The modem of claim 3, wherein the signal processor means further comprises a means for storing a power series approximation of a stored sample, and for calculating one of a first and second amplitudes from the power series approximation and the stored sample to provide one of the tones of the pair selectively at the first and second intervals of the time base.

6. The modem of claim 1, wherein the signal processor means further comprises a means for correlating the received analog signal at a frequency determined by the selecting means to recover data from the received analog signal for communication to the microcomputer means.

7. The modem of claim 6, wherein the received analog signal and the digital data modulated for transmission are frequency division multiplexed for substantially simultaneously transitting and receiving data.

8. The modem of claim 1 wherein the digital signal samples corresponding to a sinusoidal waveform comprise a mu-law compressed sinusoidal waveform.

9. The modem of claim 1, wherein the converting means comprises a coder-decoder.

10. The modem of claim 1 wherein the signal processor means and microcomputer means comprise one or more configuring input terminals and one or more configuring output terminals for coupling respective configuring output terminals to respective configuring input terminals.

11. A telephone network between an originate moden and an answer modem, said modems for transmitting and receiving analog signals over said telephone network, at least one said modem comprising:
  (a) a data terminal means for transmitting and receiving digital data;
  (b) a microcomputer means in communication with the data terminal means;
  (c) a selecting means responsive to the microcomputer means for selecting one of a relatively higher bit rate mode by differential phase shift keying, and a relatively lower bit rate mode by frequency shift keying; the selected bit rate mode determined by the bit rate mode of the originate modem;
  (d) a signal processor means in communication with the microcomputer means, said signal processor means for storing digital data samples corresponding to a mu-law compressed sinusoidal waveform;
  (e) and a converting means in communication with the signal processor means and the telephone network, said converting means for converting the digital data for transmission from the signal processor means to synthesize the analog signal for transmission over the telephone network, and for converting the received analog signal from the telephone network to the digital data.

12. The modem of claim 11, wherein the microcomputer means selects samples stored at intervals from the digital data samples stored in the signal processor means, to generate a tone pair corresponding to a dialed digit.

13. The modem of claim 12, wherein the tone pair corresponding to a dialed digit comprises a means for dividing a time base into substantially equal first and second alternating intervals and for selecting the digital data samples at intervals to generate a sample of one of the tones of the pair during alternate first intervals and for selecting a sample of the other tone of the pair during alternate second intervals.

14. The modem of claim 13 wherein the tone pair is a DTMF pair.

15. The modem of claim 13, wherein the digital data modulated for transmission is provided generally at a first amplitude and the tones of the pair are provided generally at a second amplitude, the signal processor means further comprising means for storing a power series approximation of one of the first and second amplitudes from any stored sample and for calculating the one of the first and second amplitudes from the power series approximation and the stored sample to provide signals selectively at the first and second amplitudes.

16. The modem of claim 11 wherein the converting means comprises a coder-decoder.

17. The modem of claim 11 and further comprising means for filtering the signal for transmission.

18. The modem of claim 11 and further comprising means for filtering the received signal.

19. A dialed access telephone line between an originate modem and an answer modem, at least one modem comprising a two speed full duplex modem for simultaneously transmitting and receiving an analog signal over said dialed access telephone line, said full duplex modem comprising:
  a data terminal for transmitting and receiving digital data;
  a microcomputer means in communication with the data terminal means;
  a signal processor means in communication with the microcomputer means, said signal processor means with a dual speed mode for correlating a received analog signal from the telephone line at a frequency determined by the bit rate of the originate modem to recover digital data from the received analog signal, said signal processor means for storing a plurality of digital data samples corresponding to a sinsusoidal waveform, and for selecting the digital data samples at intervals determined by the bit rate in which the originate modem is operating the synthesize an analog signal for transmission over the telephone line, and to selectively communicate over the telephone line a relatively higher bit rate by differential phase shift keying, or a relatively lower bit rate by frequency shift keying.

20. The modem of claim 19, wherein the samples corresponding to a sinusoidal waveform are a mu-law compressed sinusoidal waveform.

21. A dual speed, full duplex modem system comprising a first data terminal; a first, or originate modem; a conductor pair; a second, or answer modem; and a second data terminal; means for coupling the first data terminal to the first modem; means for coupling the second data terminal to the second modem; means for coupling the first modem to the conductor pair; means for coupling the second modem to the conductor pair; at least one of the originate and answer modems comprising a dual speed means for selectively transmitting data at or about a first carrier frequency by frequency shift keying, and for simultaneously receiving data at or about a second carrier frequency by frequency shift keying; the dual speed means further comprising means for selectively transitting data at or about a third carrier frequency by quadrature differential phase shift keying and for simultaneously receiving data at or about a fourth carrier frequency by quadrature differential phase shift keying; each modem comprising means for converting outgoing analog signals for transmission from digital data to analog signals and for converting incoming analog signals for reception from analog signals to digital data, wherein each of the first and second modems comprises a signal processor means for processing outgoing data to produce a first stream of digital data; means for coupling the signal processor means to a converter means to convert the first stream of digital data into analog signals at or about the first frequency or the third frequency, the converter means being capable of processing an incoming second stream of analog signals and converting the second stream of analog signals into received digital data for simultaneously processing by the signal processor means; means for coupling the signal processor means to the converter means to convert digital data at or about the second or fourth frequency into the second stream of digital signals, the first and second modems further comprising a microcomputer means operatively connected to the signal processor means, for storing digital data regarding the signals at or about the first, second, third and fourth frequencies and for configuring the signal processor means to selectively process the digital data at or about th first and second frequencies; or at or about the third and fourth frequencies depending upon the dual speed means of the originate modem.

22. The modem system of claim 21, wherein the microcomputer means includes a scrambler/descrambler for scrambling information supplied by one of the first and second data terminals in accordance with a predetermined scrambler algorithm; and for descrambling information received from the other of the first and second data terminals in accordance with a predetermined descrambler algorithm.

23. The modem system of claim 21, wherein the frequency shift keying is coherent.

24. The modem system of claim 21, wherein the signal processor means further comprises a means for correlating the digital data signals at or about the second and fourth frequencies to recover the second stream of digital data signals.

25. The modem system of claim 21, wherein the signal processor means further comprises a means for storing sample values corresponding to the signals at or about the first and third frequencies at various sampling points and a means for synthesizing the stored sample values at or about the first and third frequencies.

26. The modem system of claim 21, wherein the digital-to-analog converter comprises a coder-decoder.

27. A dual speed, full duplex modem system comprising a first data terminal; a first, or originate modem; a dialed-access telephone line; a second, or answer modem; a second data terminal; means for coupling the first data terminal to the first modem; means for coupling the first modem to the dialed-access telephone line; means for coupling the second modem to the second data terminal; means for coupling the second modem to the dialed access telephone line; each modem including means for transmitting data at or about a first carrier frequency by frequency shift keying and for simultaneously receiving signals at or about a second carrier frequency by frequency shift keying; each modem further including means for transmitting data at or about a third carrier frequency by quadrature differential phase shift keying and for simultaneously receiving data at or about a fourth carrier frequency by quadrature differential phase shift keying; each modem comprising means for converting outgoing signals for transmission from digital to analog form and for converting incoming signals for reception from analog to digital form; at least one of the first and second modems comprising a signal processor means for processing outgoing data to produce a first stream of digital signals; means for coupling the signal processor means to a digital-to-analog converter to convert the first stream of digital signals into analog signals at or about the first frequency or the third frequency; an analog-to-digital converter to convert signals at or about the second or fourth frequency into a second stream of digital signals; the signal processor means being capable of simultaneously processing the incoming second stream of digital signals and converting the second stream of digital signals into received data; means for coupling the signal processor means to the analog-to-digital converter; a microcomputer means for storing data regarding the signals at or about the first, second, third and fourth frequencies; and for configuring the signal processor means to selectively process signals either at or about the first and second frequencies or at or about the third and fourth frequencies.

28. The modem system of claim 27 wherein the microcomputer includes a scrambler/descrambler for scrambling information supplied by one of the first and second data terminals in accordance with a predetermined scrambler algorithm; and for descrambling information received from the other of the first and second data terminals in accordance with a predetermined descrambler algorithm.

29. The modem system of claim 27, wherein the frequency shift keying is coherent.

30. The modem system of claim 27, wherein the signal processor means further comprises a means for correlating the signals at or about the second and fourth frequencies to recover the second stream of digital data signals.

31. The modem system of claim 27, wherein the signal processor means further comprises a means for storing sample signals at or about the first and third frequencies at various sampling points and a means for synthesizing the stored sample values corresponding to the signals at or about the first and third frequencies.

* * * * *